(12) United States Patent
Nishimura

(10) Patent No.: US 9,662,969 B2
(45) Date of Patent: May 30, 2017

(54) ENGINE DEVICE

(71) Applicant: YANMAR CO., LTD., Osaka (JP)

(72) Inventor: Shinji Nishimura, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 14/779,720

(22) PCT Filed: Mar. 26, 2014

(86) PCT No.: PCT/JP2014/058429
§ 371 (c)(1),
(2) Date: Sep. 24, 2015

(87) PCT Pub. No.: WO2014/157284
PCT Pub. Date: Oct. 2, 2014

(65) Prior Publication Data
US 2016/0046181 A1    Feb. 18, 2016

(30) Foreign Application Priority Data

Mar. 28, 2013  (JP) ................. 2013-069288
Mar. 28, 2013  (JP) ................. 2013-069289
Mar. 28, 2013  (JP) ................. 2013-069290

(51) Int. Cl.
*B60K 13/04*  (2006.01)
*F01N 3/24*   (2006.01)
(Continued)

(52) U.S. Cl.
CPC ............. *B60K 13/04* (2013.01); *B66F 9/075* (2013.01); *B66F 9/07595* (2013.01);
(Continued)

(58) Field of Classification Search
CPC ...... B60K 13/04; B66F 9/075; B66F 9/07595; E02F 9/0866; E02F 9/2066; E02F 9/267;
(Continued)

(56) References Cited

U.S. PATENT DOCUMENTS 8,191,668 B2 * 6/2012 Keane .................... B60K 13/04
                                                180/296
8,418,448 B2 * 4/2013 Kamata ................ B60K 5/1208
                                                 60/299

(Continued)

FOREIGN PATENT DOCUMENTS

JP     60-47823 U    4/1985
JP     10-109654 A   4/1998
(Continued)

*Primary Examiner* — John Walters
(74) *Attorney, Agent, or Firm* — Norris McLaughlin & Marcus, P.A.

(57) ABSTRACT

Provided is an engine device that facilitates fastening between a main machine frame (140) and a side surface of an exhaust gas purification case (38) so that workability of mounting the exhaust gas purification case (38) can be easily improved. The engine device is provided with the exhaust gas purification case (38) for processing exhaust gas from an engine (1), and the exhaust gas purification ease (38) is disposed on a main machine (120) side on which the engine (1) is mounted. The engine device is provided with the main machine frame (140) on which the engine (1) and the like are mounted. The main machine frame (140) is provided with a bottom support member (141) for supporting the exhaust gas purification case (38) and side support devices (143, 144) for fastening and fixing the exhaust gas purification case (38) to the main machine frame (140) in an attachable and detachable manner.

8 Claims, 25 Drawing Sheets

(51) Int. Cl.
  *E02F 9/08*    (2006.01)
  *E02F 9/20*    (2006.01)
  *E02F 9/26*    (2006.01)
  *B66F 9/075*   (2006.01)
  *F01N 13/18*   (2010.01)
  *F02D 41/02*   (2006.01)
  *F01N 3/021*   (2006.01)
  *F01N 3/20*    (2006.01)

(52) U.S. Cl.
  CPC .......... *E02F 9/0866* (2013.01); *E02F 9/2066* (2013.01); *E02F 9/267* (2013.01); *F01N 3/021* (2013.01); *F01N 3/2066* (2013.01); *F01N 3/24* (2013.01); *F01N 13/1805* (2013.01); *F02D 41/029* (2013.01); *B60Y 2200/62* (2013.01); *F01N 2590/08* (2013.01)

(58) Field of Classification Search
  CPC .......... F01N 3/021; F01N 3/2066; F01N 3/24; F01N 13/1805; F02D 41/029
  USPC ........................................................ 180/309
  See application file for complete search history.

(56) References Cited

U.S. PATENT DOCUMENTS

| | | | |
|---|---|---|---|
| 8,915,328 B2 * | 12/2014 | Okada | E02F 9/0866 180/309 |
| 8,979,125 B2 * | 3/2015 | Sato | E02F 9/0866 180/196 |
| 2006/0065231 A1 | 3/2006 | Nozaki et al. | |
| 2010/0275588 A1 | 11/2010 | Kamata et al. | |
| 2014/0144717 A1 | 5/2014 | Nakashima et al. | |

FOREIGN PATENT DOCUMENTS

| | | |
|---|---|---|
| JP | 2003-041931 A | 2/2003 |
| JP | 2003-328752 | 11/2003 |
| JP | 2006-096175 A | 4/2006 |
| JP | 2008-208726 | 9/2008 |
| JP | 2009-051303 | 3/2009 |
| JP | 2009-096289 | 5/2009 |
| JP | 2010-143451 | 7/2010 |
| JP | 2010-185340 | 8/2010 |
| JP | 2010-215118 | 9/2010 |
| JP | 2010-229984 A | 10/2010 |
| JP | 2011-135846 | 7/2011 |
| JP | 2011-220238 | 11/2011 |
| JP | 2011-231736 | 11/2011 |
| JP | 2012002132 | 1/2012 |
| JP | 2012-072723 | 4/2012 |
| JP | 2012-219624 | 11/2012 |
| JP | 2012-229633 A | 11/2012 |
| JP | 2013-000001 | 1/2013 |
| JP | 2013-001132 | 1/2013 |
| WO | WO-2008/136203 | 11/2008 |
| WO | 2013/011666 A1 | 1/2013 |
| WO | WO-2014/054192 | 4/2014 |

\* cited by examiner

ENGINE DEVICE

TECHNICAL FIELD

The present invention relates to an engine device such as a diesel engine mounted in for example, a work vehicle such as a skid steering loader, a backhoe, or a fork lift truck, an agricultural machine such as a tractor or a combine, a stationary type generator or refrigerator, or the like. More specifically, the present invention relates to an engine device such as a diesel engine with an exhaust gas purification device for purifying exhaust gas.

BACKGROUND OF THE INVENTION

Conventionally, there is developed a technique for purifying exhaust gas from a diesel engine by disposing an exhaust gas purification device (diesel particulate filter) in an exhaust gas flow path of the engine and by using an oxidation catalyst, a soot filter, or the like of the exhaust gas purification device (see, for example, Patent Document 1, Patent Document 2, or Patent Document 3).

Conventionally, there is a structure in which the exhaust gas purification device is mounted on the engine (see, for example, Patent Document 1 or Patent Document 2), or a structure in which the exhaust gas purification device is disposed separately from the engine (see, for example, Patent Document 3).

PRIOR ART DOCUMENTS

Patent Document 1: JP-A-2010-185340
Patent Document 2: JPA-2012-72723
Patent Document 3: JP-A-2008-208726

SUMMARY OF THE INVENTION

In the structure in which the exhaust gas purification device is mounted on the engine as described in Patent Document 1 or Patent Document 2, it is necessary to secure a space for disposing the exhaust gas purification device adjacent to the engine. As a result, there are problems that a layout of the engine with respect to a main machine is apt to be restricted, and that it is not easy to simplify a structure of an engine room in which a radiator for cooling the engine is also disposed.

In addition, if the exhaust gas purification device is disposed separately from the engine as described in Patent Document 3, the restriction of layout of the engine with respect to the main machine can be relieved, but it is necessary to prevent temperature drop of the exhaust gas supplied from the engine to the exhaust gas purification device and to dispose a support member of the exhaust gas purification device on the main machine frame side. Accordingly, there is a problem that a support structure for the exhaust gas purification device cannot be easily simplified. Further, it is also necessary to dispose control equipment such as a lamp or a switch necessary for monitoring or regeneration control of the engine or the exhaust gas purification device.

Accordingly, it is an object of the present invention to provide an improved engine device based on study of the above-mentioned current situation.

The engine device includes an exhaust gas purification case for processing exhaust gas from an engine, and the exhaust gas purification case is disposed on a main machine side on which the engine is mounted. The engine device includes a main machine frame in which the engine and the like are disposed. The main machine frame is provided with a bottom support member for supporting the exhaust gas purification case, and a side support member for connecting and fixing the exhaust gas purification case to the main machine frame in an attachable and detachable manner.

The engine device is configured in such a manner that both sides and a bottom side of the exhaust gas purification case are surrounded by the main machine frame, the exhaust gas purification case is assembled to the main machine frame from above, the right and left center of the exhaust gas purification ease is supported by the bottom support member, and right and left sides of the exhaust gas purification case are supported by the side support member.

The engine device is configured in such a manner that the bottom support member is disposed on at least one of an exhaust gas purification case tower surface and a main machine frame upper surface opposed to the exhaust gas purification case lower surface, and the side support member is disposed on at least one set of right and left side surfaces of the exhaust gas purification case and main machine frame inside surfaces opposed to the right and left side surfaces of the exhaust gas purification case.

The engine device is configured in such a manner that an exhaust gas outlet of the engine and an exhaust gas inlet of the exhaust gas purification case are disposed on a straight line parallel to an output shaft axis of the engine.

The engine device is configured in such a manner that a tail pipe is disposed and biased to a side portion opposite to an exhaust manifold disposing side of the engine among side portions of the main machine provided with a work portion, the exhaust gas purification case is disposed to be opposed to a cooling fan of the engine, and an inlet pipe side of the exhaust gas purification case is disposed on the same side portion as the exhaust manifold disposing side of the engine.

The engine device is configured in such a manner that a tad pipe is disposed and biased to a side portion on an exhaust manifold disposing side of the engine among side portions of the main machine provided with a work portion, the exhaust gas purification case is disposed to be opposed to a cooling fan of the engine, an inlet pipe side of the exhaust gas purification case is disposed on the same side portion as the exhaust manifold disposing side of the engine, and an outlet pipe of the exhaust gas purification case is disposed to extend below an exhaust pipe between the exhaust manifold and the inlet pipe.

The engine device is configured in such a manner to include an operation display portion for displaying an operation state of the engine and the like, an engine controller for controlling the engine and the like, and a regeneration operation tool of the exhaust gas purification case. The operation display portion is electrically connected to the regeneration operation tool.

The engine device is configured in such a manner that the engine controller is disposed on an intake upstream side of cooling air in an engine room in which the engine and the like are disposed.

The engine device is configured in such a manner that when proceeding to an operation state requiring regeneration of the exhaust as purification case, a rotational frequency of the engine is automatically decreased, an abnormal operation state is notified to an operator, and a meter controller of the operation display portion and the engine controller are connected with a communication line enabling mutual communication.

According to the engine device, because the engine device includes an exhaust gas purification case for processing exhaust gas from an engine, the exhaust gas purification case is disposed on a main machine side on which the engine is mounted, the engine device includes a main machine frame in which the engine and the like are disposed, and the main machine frame is provided with a bottom support member for supporting the exhaust gas purification case and a side support member for connecting and fixing the exhaust gas purification case to the main machine frame in an attachable and detachable manner, hence the exhaust gas purification case side surface can be fastened to the main machine frame via the side support member after temporarily support the exhaust gas purification case by the main machine frame via the bottom support member. Thus, assembling workability of the exhaust gas purification case can be easily improved.

According to the engine device, because the both sides and a bottom side of the exhaust gas purification case are surrounded by the main machine frame, the exhaust gas purification case is assembled to the main machine frame from above, the right and left center of the exhaust gas purification case is supported by the bottom support member, and right and left sides of the exhaust as purification case are supported by the side support member, hence three sides of the exhaust gas purification case can be connected to the main machine frame. Thus, a support structure of the exhaust gas purification case can be easily configured.

According to the engine device, because the bottom support member is disposed on at least one of an exhaust gas purification case lower surface and a main machine frame upper surface opposed to the exhaust gas purification case lower surface, and the side support member is disposed on at least one set of right and left side surfaces of the exhaust gas purification case and main machine frame inside surfaces opposed to the right and left side surfaces of the exhaust gas purification case, hence a large weight of the exhaust gas purification case can be easily supported by the bottom support member. For instance, when the exhaust gas purification case is attached or detached, it is easy to prevent the exhaust gas purification case from dropping off from a support position. When both sides of the exhaust gas purification case are fixed to the main machine frame, it is easy to prevent the exhaust gas purification case from being deformed or damaged due to mechanical vibration or the like.

According to the engine device, because an exhaust gas outlet of the engine and an exhaust gas inlet of the exhaust gas purification case are disposed on a straight line parallel to an output shaft axis of the engine, it is easy to maintain temperature of the exhaust gas supplied to the exhaust gas purification case though the exhaust gas purification case can be disposed corresponding to a structure or the like of the engine room. Thus, an exhaust gas purification function of the exhaust gas purification case can be appropriately maintained.

According to the engine device, because a tail pipe is disposed and biased to a side portion opposite to an exhaust manifold disposing side of the engine among side portions of the main machine provided with a work portion, the exhaust gas purification case is disposed to be opposed to a cooling fan of the engine, and an inlet pipe side of the exhaust gas purification ease is disposed on the same side portion as the exhaust manifold disposing side of the engine, hence the exhaust gas purification case can be easily assembled utilizing an excess space of a cooling fan disposing portion, and the tail pipe or the exhaust manifold can be easily connected to an exhaust gas inlet or outlet side of the exhaust gas purification case.

According to the engine device, because a tail pipe is disposed and biased to a side portion on an exhaust manifold disposing side of the engine among side portions of the main machine provided with a work portion, the exhaust gas purification case is disposed to be opposed to a cooling fan of the engine, an inlet pipe side of the exhaust gas purification ease is disposed on the same side portion as the exhaust manifold disposing side of the engine, and an outlet pipe of the exhaust gas purification case is disposed to extend below an exhaust pipe between the exhaust manifold and the inlet pipe, hence the exhaust pipe between the exhaust manifold and the inlet pipe can be disposed away front a cooling fan air flow path or the like of the engine. Thus, temperature of the exhaust gas moving to the exhaust gas purification case via the exhaust pipe can be easily maintained, and the outlet pipe of the exhaust gas purification case can be easily disposed corresponding to a position of the tail pipe in addition, it is possible to dispose the outlet pipe of the exhaust gas purification case to extend to the cooling fan air flow path or the like of the engine, so that the exhaust gas can be discharged from the outlet pipe to the outside of the machine while decreasing the temperature. Thus, it is possible to prevent the tail pipe or the like from being heated by the exhaust gas.

According to the engine device, because the engine device includes an operation display portion for displaying an operation state of the engine and the like, an engine controller for controlling the engine and the like, and a regeneration operation tool of the exhaust gas purification case, in which the operation display portion is electrically connected to the regeneration operation tool, hence the regeneration operation tool adapted to an operation condition of the engine or the regeneration control of the exhaust gas purification case can be disposed at a position for an operator to easily operate without substantially changing the operation display portion or the engine controller.

According to the engine device, because the engine controller is disposed on an intake upstream side of cooling air in an engine room in which the engine and the like are disposed, it is possible to prevent abnormal temperature rise of the engine controller due to heating of the engine or the exhaust gas purification ease. Thus, durability of the engine controller or the like can be improved while easily preventing malfunction or the like of the engine controller.

According to the engine device, because when proceeding to an operation state requiring regeneration of the exhaust gas purification case, a rotational frequency of the engine is automatically decreased, an abnormal operation state is notified to an operator, and a meter controller of the operation display portion and the engine controller are connected with a communication line enabling mutual communication, hence engine rotation is maintained at low rotation when an operator operates a throttle to increase the rotation. Thus, the operator can smoothly check an abnormal operation state of the engine. In addition, the meter controller can easily hold a regeneration control function of the exhaust gas purification case, and a specification of the operation display portion or a specification of the engine controller can be easily set with little limitations. For instance, regeneration control specification of the exhaust gas purification case suitable for operating conditions can be set with little limitation of specification on the engine side. The regeneration control function of the exhaust gas purification case can be improved.

DESCRIPTION OF THE PREFERRED EMBODIMENTS

Figure 1:
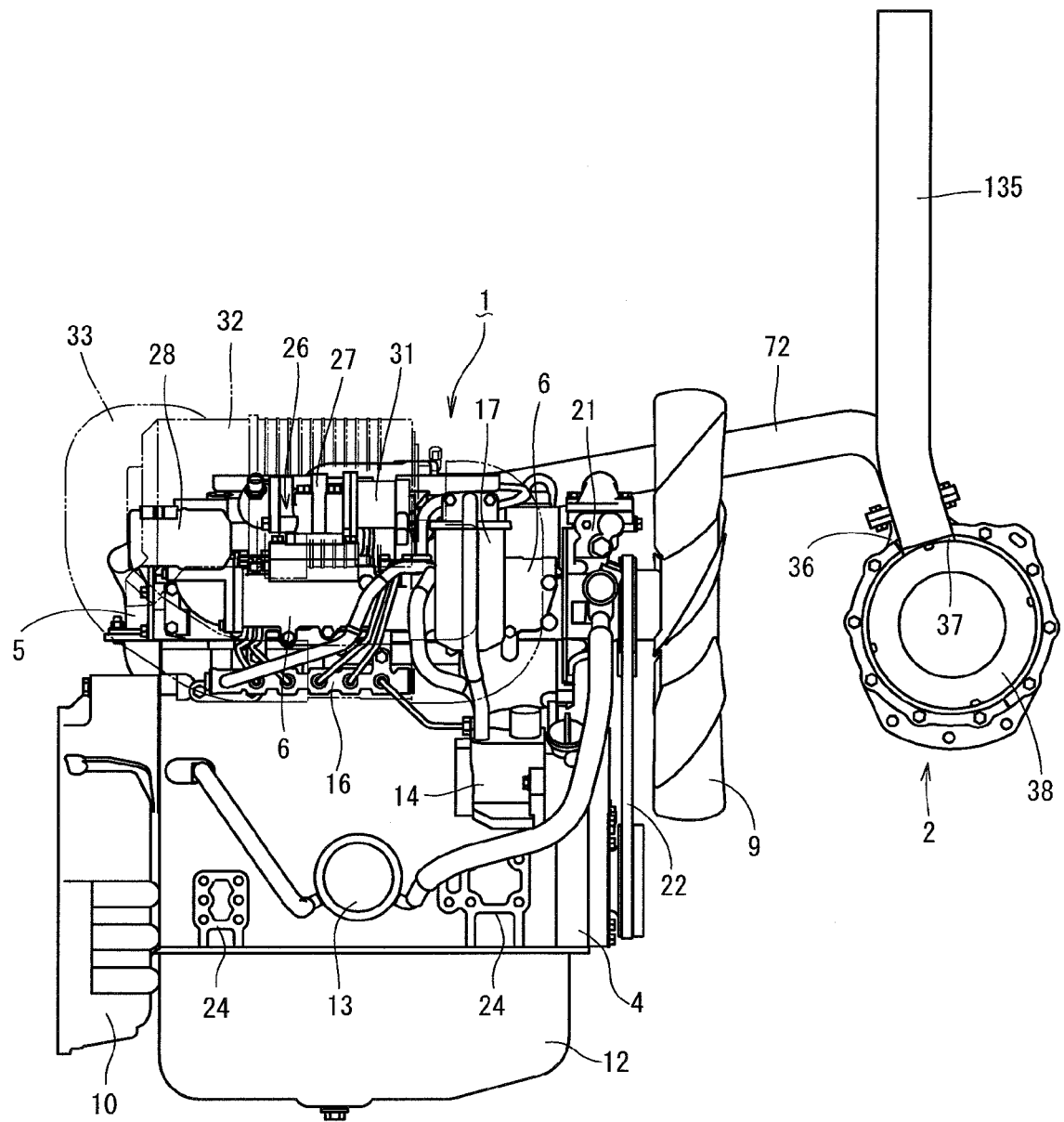
FIG. 1 is a right side view of a diesel engine showing a first embodiment.
Figure 2:
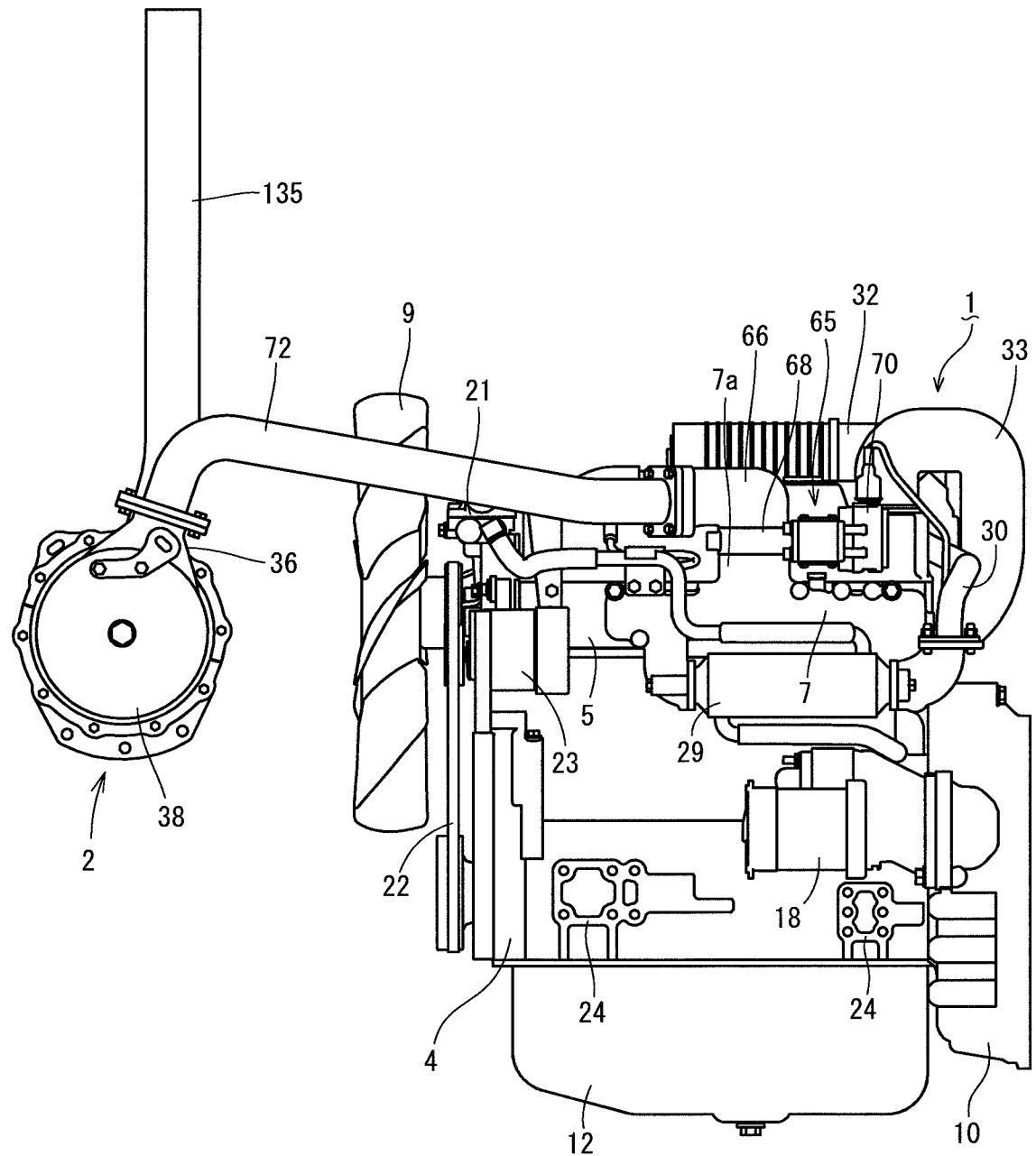
FIG. 2 is a left side view of the diesel engine.
Figure 3:
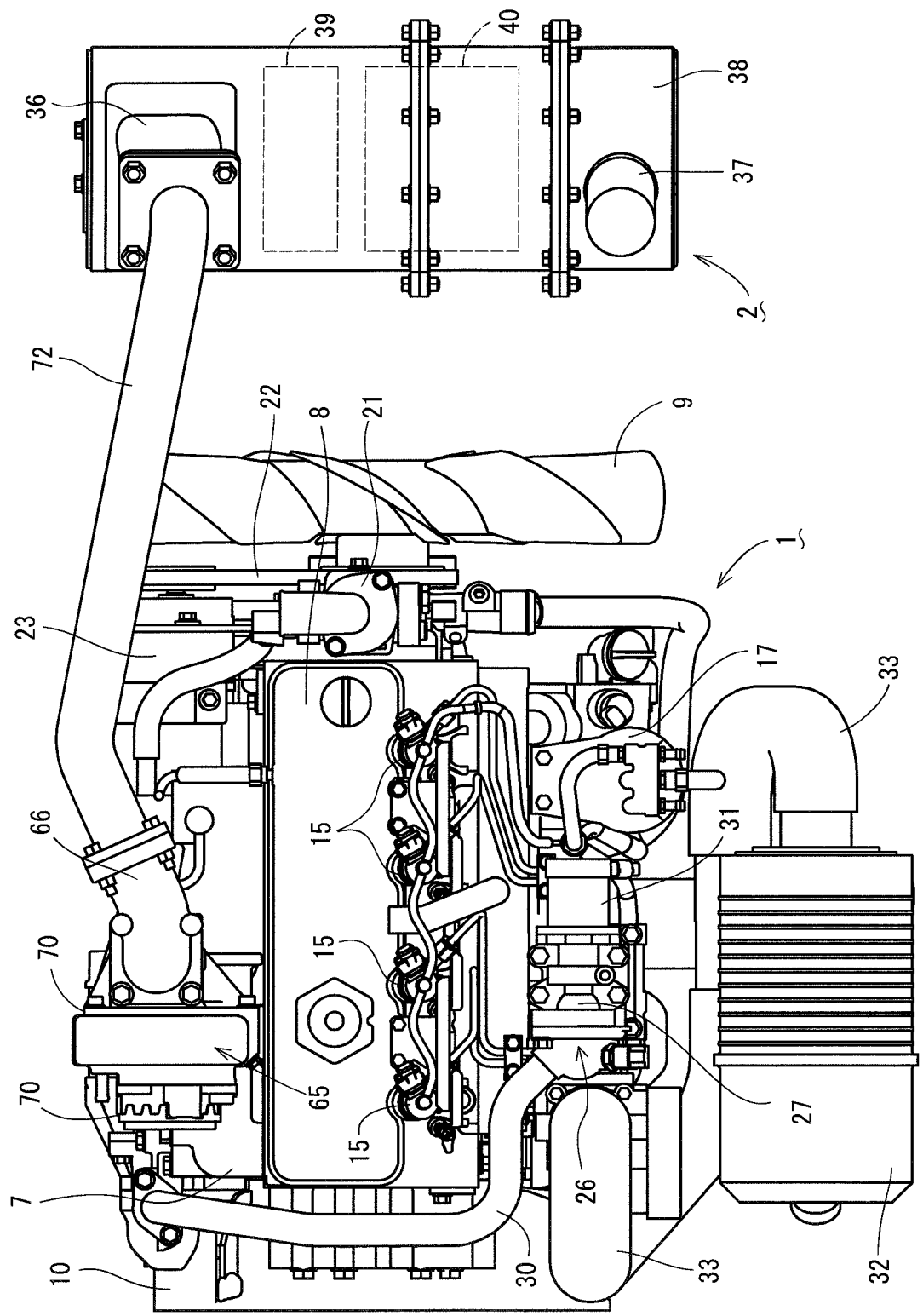
FIG. 3 is a plan view of the same.
Figure 4:
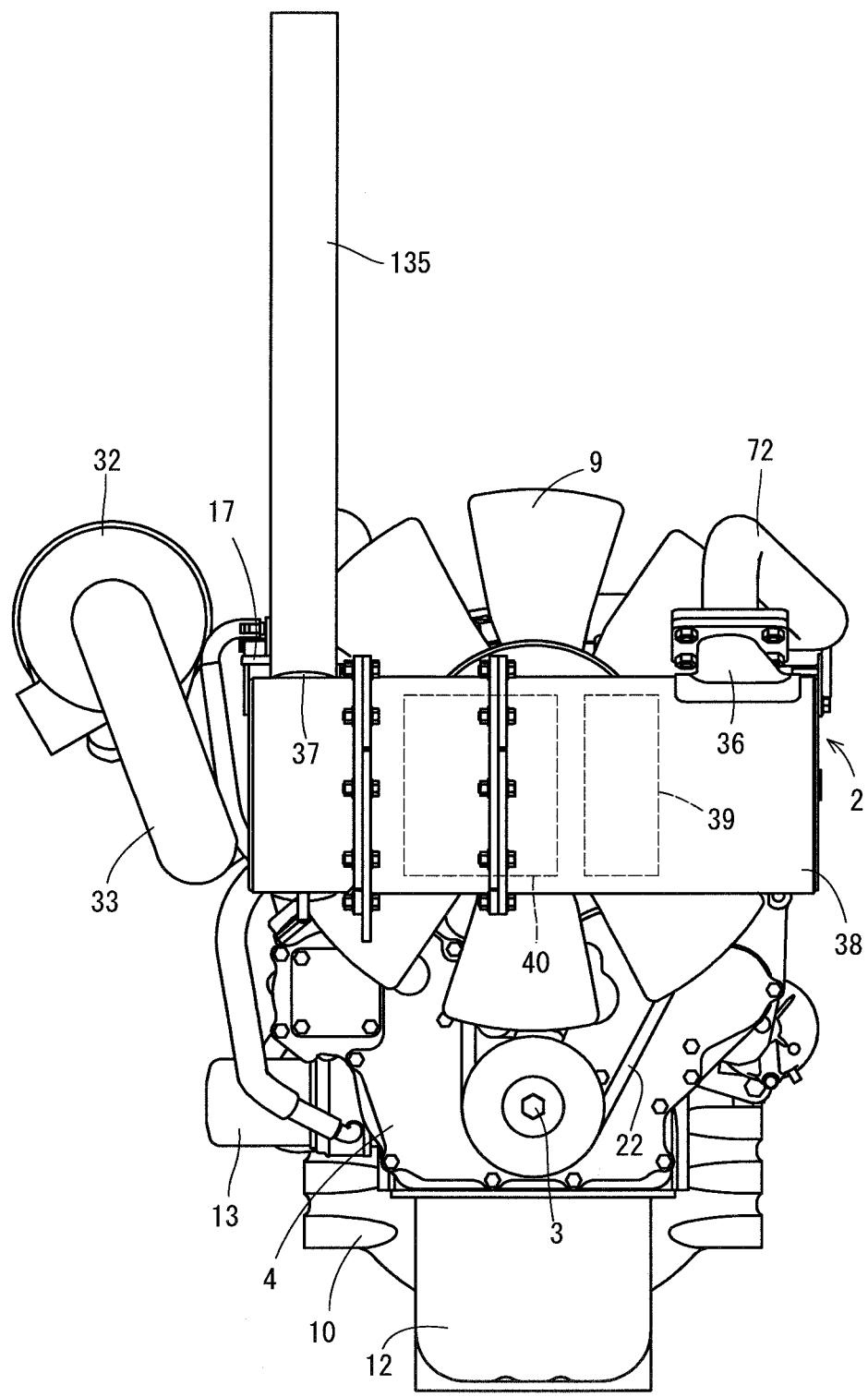
FIG. 4 is a front view of the same.
Figure 5:
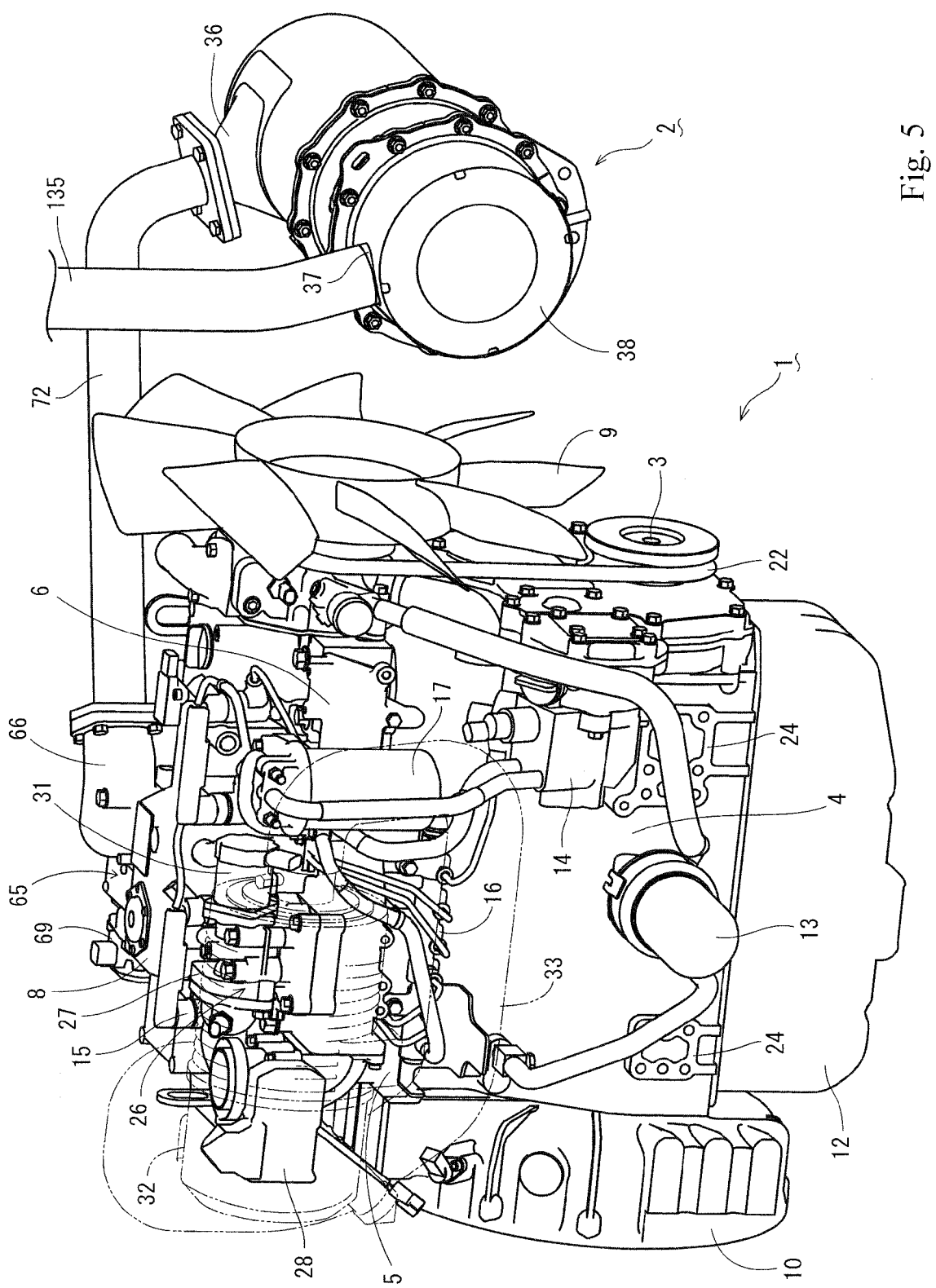
FIG. 5 is a right perspective view of the same.
Figure 6:
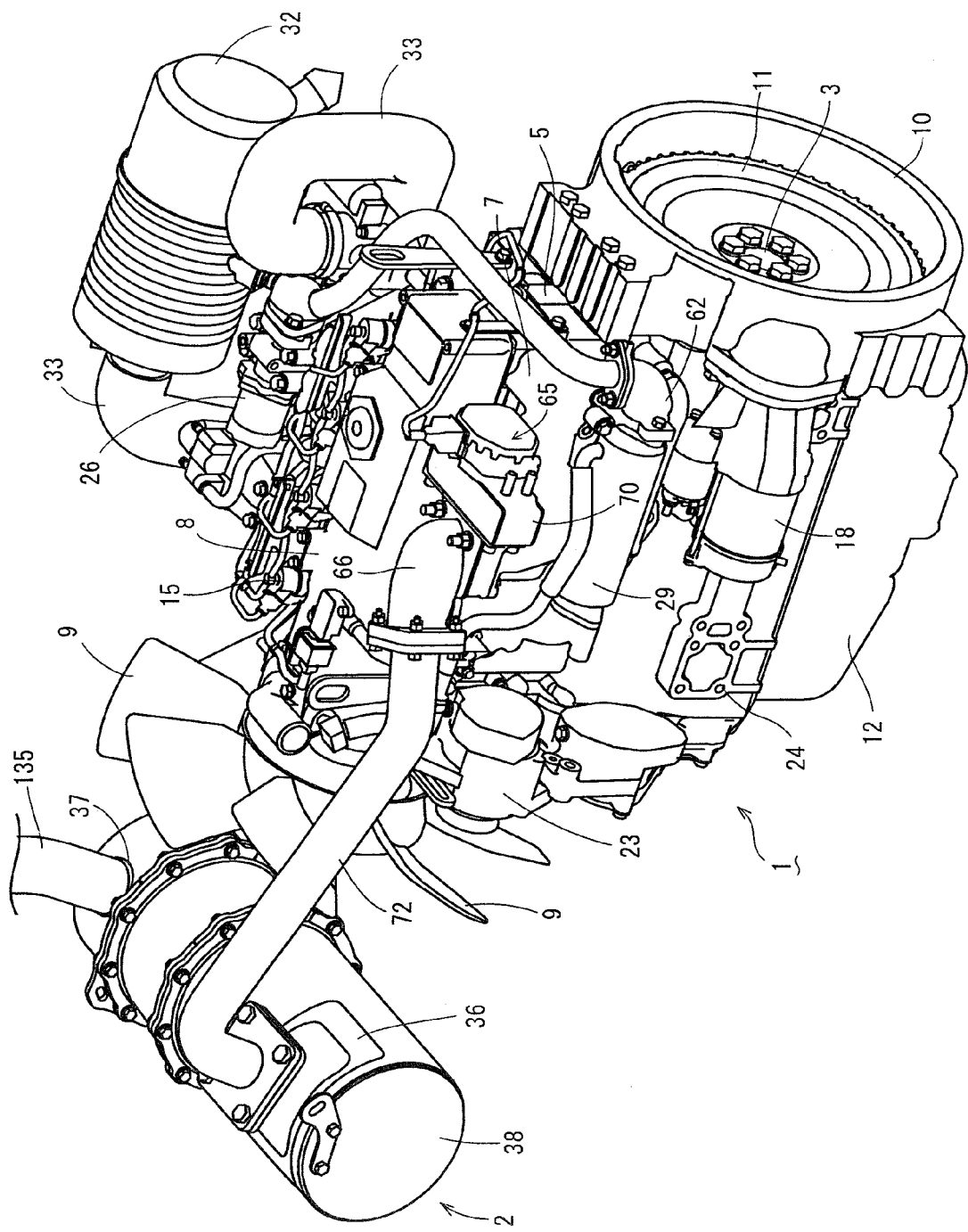
FIG. 6 is a left perspective view of the same.

Now, embodiments of an engine device of the present invention is described on the basis of the drawings with reference to FIGS. 1 to 17. A diesel engine 1, which is mounted as an engine machine in a construction machine, a civil engineering machine, an agricultural machine, a cargo handling machine, or the like, includes a continuous regeneration type exhaust gas purification device 2 (diesel particulate filter). The exhaust gas purification device 2 removes particulate matter (PM) in exhaust gas from the diesel engine 1 and reduces carbon monoxide (CO) and hydrocarbon (HC) in the exhaust gas from the diesel engine 1.

The diesel engine 1 includes a cylinder block 4 incorporating a crank shaft 3 for engine output and a piston (not shown). A cylinder head 5 is placed on the cylinder block 4. An intake manifold 6 is disposed on a right side surface of the cylinder head 5. An exhaust manifold 7 is disposed on a left side surface of the cylinder head 5. A head cover 8 is disposed on an upper side surface of the cylinder head 5. A cooling fan 9 is disposed on a front side surface of the cylinder block 4 (front side of the diesel engine 1). A flywheel housing 10 is disposed on a backside surface of the cylinder block 4 (rear side of the diesel engine 1). A flywheel 11 is disposed in the flywheel housing 10.

The flywheel 11 is connected to the crank shaft 3 (engine output shaft). Power of the diesel engine 1 is output to an action part of the work vehicle (such as a backhoe or a fork lift) via the crank shaft 3. In addition, an oil pan 12 is disposed on an underside of the cylinder block 4. Lubricant in the oil pan 12 is supplied to lubricating parts of the diesel engine 1 via an oil filter 13 disposed on the side surface of the cylinder block 4.

A fuel supply pump 14 for supplying fuel is attached to the side surface of the cylinder block 4 above the oil filter 13 (below the intake manifold 6). The diesel engine 1 is provided with injectors 15 having an electromagnetic switch control type fuel injection valve (not shown) for four cylinders. Each injector 15 is connected to a fuel tank (not shown) provided to the work vehicle via the fuel supply pump 14, a cylindrical common rail 16 and a fuel filter 17.

The fuel in the fuel tank is compressed and sent from the fuel supply pump 14 to the common rail 16 via the fuel filter 17 so that high-pressure fuel is stored in the common rail 16. When the fuel injection valve of each injector 15 is controlled to open and close, the high-pressure fuel in the common rail 16 is injected from each injector 15 to each cylinder of the diesel engine 1.

A cooling water pump 21 for circulating cooling water is disposed coaxially to a fan shaft of the cooling fan 9 on the front upper part of the cylinder block 4. When the crank shaft 3 is rotated, the cooling fan 9 and the cooling water pump 21 are driven via a cooling fan drive V-belt 22. The cooling water in a radiator 121 mounted in the work vehicle (fork lift truck 120) as described later is supplied to the cooling water pump 21 when the cooling water pump 21 is driven. Then, the cooling water is provided to the cylinder block 4 and the cylinder head 5 so that the diesel engine 1 is cooled. Note that an alternator 23 is disposed on a left side of the cooling water pump 21.

An engine leg attachment part 24 is disposed on each of the right and left side surfaces of the cylinder block 4. An engine leg body 137 (see FIG. 11) having an anti-vibration rubber 136 is fastened with bolts to each engine leg attachment part 24. The diesel engine 1 is supported in an anti-vibration manner by the work vehicle (an engine attachment chassis 138 of the backhoe, the fork lift truck, or the like) via the engine leg bodies 137.

Further, an EGR device 26 (exhaust gas recirculation device) is described. A fresh air inlet pipe 33 of an air cleaner 32 is connected to an inlet part of the intake manifold 6 protruding upward via the EGR device 26 (exhaust gas recirculation device). The fresh air (external air) is sent from the air cleaner 32 to the intake manifold 6 via the EGR device 26.

The EGR device 26 includes an EGR main body case 27 (collector) that mixes a part of the exhaust gas from the diesel engine 1 (EGR gas from the exhaust manifold 7) with the fresh air (external air from the air cleaner 32) so as to supply the mixture to the intake manifold 6, an intake throttle member 28 that permits the air cleaner 32 to communicate to the EGR main body case 27, a recirculation exhaust gas pipe 30 as a reflux pipeline connected to the exhaust manifold 7 via an EGR cooler 29, and an EGR valve member 31 that permits the recirculation exhaust gas pipe 30 to communicate to the EGR main body case 27.

In other words, the intake manifold 6 is connected to the intake throttle member 28 for taking in fresh air via the EGR main body case 27. Further, the EGR main body case 27 communicates to an outlet side of the recirculation exhaust gas pipe 30 extending from the exhaust manifold 7. The EGR main body case 27 is shaped in an elongated cylindrical shape. The intake throttle member 28 is fastened with bolts to one end of the EGR main body case 27 in a longitudinal direction. A downwardly opening end of the EGR main body case 27 is fastened with bolts to the inlet part of the intake manifold 6 in an attachable and detachable manner.

In addition, the outlet side of the recirculation exhaust gas pipe 30 is connected to the EGR main body case 27 via the EGR valve member 31. An inlet side of the recirculation exhaust gas pipe 30 is connected to a lower surface side of the exhaust manifold 7 via the EGR cooler 29. By adjusting an aperture of the EGR valve (not shown) in the EGR valve member 31, a supplying amount of the EGR gas to the EGR main body case 27 is adjusted.

With the structure described above, the fresh air (external air) is supplied from the air cleaner 32 into the EGR main body case 27 via the intake throttle member 28, while the EGR gas (a part of the exhaust gas discharged from the exhaust manifold 7) is supplied from the exhaust manifold 7 into the EGR main body case 27 via the EGR valve member 31. The fresh air from the air cleaner 32 and the EGR gas from the exhaust manifold 7 are mixed in the EGR main body case 27, and the mixture gas in the EGR main body case 27 is supplied to the intake manifold 6. In other words, a part of the exhaust gas discharged from the diesel engine 1 to the exhaust manifold 7 is returned from the intake manifold 6 to the diesel engine 1, and hence a maximum combustion temperature in high load operation is lowered so that the exhaustion amount of nitrogen oxide (NOx) from the diesel engine 1 is reduced.

Next, with reference to FIGS. 1 to 6, and 11, the exhaust gas purification device 2 is described. The exhaust gas purification device 2 is equipped with an exhaust gas purification case 38 including a purification inlet pipe 36 and a purification outlet pipe 37. A diesel oxidation catalyst 39 (gas purification body) such as platinum for generating nitrogen dioxide (NO2) and a soot filter 40 (gas purification body) having a honeycomb structure for continuously oxidizing and removing collected particulate matter (PM) at relatively low temperature are arranged in series in a moving direction of the exhaust gas in the exhaust gas purification case 38. Note that the purification outlet pipe 37 is connected to a tail pipe 135.

With the structure described above, nitrogen dioxide (NO2) generated by the oxidation action of the diesel oxidation catalyst 39 is supplied into the soot filter 40. The particulate matter (PM) contained in the exhaust gas from the diesel engine 1 is collected by the soot filter 40 and is continuously oxidized and removed by the nitrogen dioxide (NO2). In addition to the removal of the particulate matter (PM) in the exhaust gas from the diesel engine 1, content amounts of carbon monoxide (CO) and hydrocarbon (HC) in the exhaust gas from the diesel engine 1 are reduced.

Note that thermistor type upstream and downstream exhaust gas temperature sensors 43 (see FIG. 12) are attached to the exhaust gas purification case 38. An exhaust gas temperature on a gas inlet side end surface of the diesel oxidation catalyst 39 and an exhaust gas temperature on a gas outlet side end surface of the diesel oxidation catalyst are respectively detected by the exhaust gas temperature sensors 43.

Further, a differential pressure sensor 44 (see FIG. 12) as an exhaust gas pressure sensor is attached to the exhaust as purification case 38. An exhaust gas pressure difference between the upstream side and the downstream side of the soot filter 40 is detected by the differential pressure sensor 44. On the basis of the exhaust gas pressure difference between the upstream side and the downstream side of the soot filter 40, a deposition amount of the particulate matter on the soot filter 40 is calculated so that a clogging state of the soot filter 40 can be grasped.

With the structure described above, a difference between the exhaust gas pressure on the inlet side of the soot filter 40 and the exhaust gas pressure on the outlet side of the soot filter 40 (exhaust gas differential pressure) is detected by the differential pressure sensor 44. As shown in the control circuit diagram of FIG. 12 and a flowchart of FIG. 13, because a remaining amount of the particulate matter in the exhaust gas collected by the soot filter 40 is proportional to the differential pressure of the exhaust gas, when the remaining amount of the particulate matter on the soot filter 40 is increased to be larger than a predetermined amount, regeneration control of reducing the particulate matter amount on the soot filter 40 (for example, control of increasing an exhaust gas temperature) is performed on the basis of a detection result by the differential pressure sensor 44.

On the other hand, as shown in FIGS. 1, 8, and 12 to 17, there is disposed an exhaust gas throttle device 65 that increases exhaust gas pressure of the diesel engine 1. An exhaust gas outlet body 7a of the exhaust manifold 7 is opened upward. An exhaust gas outlet body 7a of the exhaust manifold 7 is connected to an elbow-like relay pipe 66 in an attachable and detachable manner via the exhaust gas throttle device 65 for adjusting exhaust gas pressure of the diesel engine 1. The exhaust gas throttle device 65 includes a throttle valve case 68 housing an exhaust gas throttle valve (not shown), and a water cooled case 70 housing an electric motor (not shown) or the like for opening control of the exhaust gas throttle valve.

The throttle valve case 68 is placed on the exhaust gas outlet body 7a, the relay pipe 66 is placed on the throttle valve case 68, and the exhaust gas outlet body 7a is fastened with four bolts 71 to the relay pipe 66 via the throttle valve case 68. A laterally opened part of the relay pipe 66 is connected to the purification inlet pipe 36 via an exhaust pipe 72. Accordingly, the exhaust gas purification case 38 (exhaust gas purification device 2) described above is connected to the exhaust manifold 7 via the relay pipe 66 and the exhaust gas throttle device 65. In other words, the exhaust gas moves from the outlet of the exhaust manifold 7 into the exhaust gas purification case 38 via the purification inlet pipe 36, the exhaust gas is purified in the exhaust gas purification case 38, and the exhaust gas is moved from the purification outlet pipe 37 to the tail pipe 135 so as to be discharged to the outside of the machine.

With the structure described above, by controlling the exhaust gas throttle device 65 (electric motor) on the basis of the pressure difference detected by the differential pressure sensor 44, regeneration control of the soot filter 40 is performed. In other words, when soot is deposited on the soot filter 40, the pressure of the exhaust gas from the diesel engine 1 is increased by control of closing the exhaust gas throttle device 65 (exhaust gas throttle valve), and hence temperature of the exhaust gas discharged from the diesel engine 1 is increased to a high temperature so that the soot deposited on the soot filter 40 is burned. As a result, the soot is removed, and the soot filter 40 is regenerated.

In addition, when a work with small load in which temperature of the exhaust gas is apt to be low (a work in which soot is apt to be deposited) is continuously performed, the soot filter 40 can be regenerated by forcibly increasing the exhaust gas pressure (exhaust gas temperature) with the exhaust gas throttle device 65, and hence the exhaust gas purification ability of the exhaust gas purification device 2 can be appropriately maintained. In addition, a burner or the like for burning the soot deposited on the soot filter 40 is not necessary. In addition, when the engine 1 is started, the pressure of the exhaust gas from the diesel engine 1 is increased by control of the exhaust gas throttle device 65, and hence the temperature of the exhaust gas from the diesel engine 1 is increased to high temperature so that warming up of the diesel engine 1 can be promoted.

As shown in FIGS. 1 to 6, in the engine device including the engine 1 equipped with the exhaust manifold 7, in which the exhaust gas pressure in the exhaust manifold 7 is adjusted by the exhaust gas throttle device 65, the exhaust gas outlet of the exhaust manifold 7 is connected to the exhaust gas inlet side of the throttle valve case 68 of the exhaust gas throttle device 65, and the exhaust manifold 7 is connected to the exhaust pipe 72 via the throttle valve case 68. Accordingly, the exhaust manifold 7 having high stiffness can support the exhaust gas throttle device 65, so that the support structure of the exhaust gas throttle device 65 can be configured to have high stiffness. Further, compared with the structure in which the exhaust manifold 7 is connected to the throttle valve case 68 via the relay pipe 66, for example, a volume of the exhaust gas inlet side of the exhaust gas throttle device 65 can be reduced, and the exhaust gas pressure in the exhaust manifold 7 can be adjusted with high accuracy. Thus, temperature of the exhaust gas to be supplied to the exhaust gas purification device 2 and the like can be easily maintained at a temperature suitable for exhaust gas purification.

As shown in FIGS. 1 to 6, the throttle valve case 68 is fastened to the upper surface side of the exhaust manifold 7, the relay pipe 66 is fastened to the upper surface side of the throttle valve case 68, the throttle valve case 68 and the relay pipe 66 are disposed in a multi-layered manner to the exhaust manifold 7, and the exhaust pipe 72 is connected to the relay pipe 66 of the top layer. Accordingly, without changing the supporting posture of the exhaust gas throttle device 65, and without changing specification of the relay pipe 66, attachment posture of the relay pipe 66 (connection direction of the exhaust pipe 72) can be changed in accordance with an attachment position of the exhaust gas purification device 2, for example.

With reference to FIGS. 7 to 11, a structure in which the diesel engine 1 is mounted in the fork lift truck 120 is described. As shown in FIGS. 7 to 10, the fork lift truck 120 includes a traveling machine body 124 equipped with a pair of right and left front wheels 122 and a pair of right and left rear wheels 123. A driving part 125 and a diesel engine 1 are mounted in the traveling machine body 124. A work portion 127 including a fork 126 for a loading and unloading work is disposed on a front side portion of the traveling machine body 124. A driving seat 128 for an operator to sit, a steering wheel 129, operation means for operating output of the diesel engine 1 and the like, a lever or a switch as operation means for the work portion 127, and the like are arranged in the driving part 125.

The rear wheels 123 are steered by a rotating operation of the steering wheel 129 so that a moving direction is changed. On the other hand, the fork 126 is disposed in an upwardly and downwardly movable manner along a mast 130 as an element of work portion 127. The fork 126 is moved upwardly and downwardly, a palette (not shown) on which cargo is placed is loaded on the fork 126, and the traveling machine body 124 is moved frontward and backward, so as to perform loading and unloading work such as transportation of the palette.

In this fork lift truck 120, the diesel engine 1 is disposed under the driving seat 128, the radiator 121 is disposed on the rear side of the diesel engine 1, and the exhaust gas purification device 2 is disposed on the rear side of the radiator 121. Accordingly, the exhaust pipe 72 connecting the diesel engine 1 and the exhaust gas purification device 2 extends from the front side to the read side of the radiator 121 in such a manner that an intermediate part of the exhaust pipe 72 goes around the right side portion of the radiator 121. Thus, the exhaust gas purification device 2 is disposed away from the diesel engine 1. In addition, the tail pipe 135 connecting to the exhaust gas purification device 2 extends upward from the exhaust gas purification device 2 to above a bonnet 139 behind the left side of the driving seat 128. In this way, the exhaust gas discharged from the exhaust gas purification device 2 passes through the tail pipe 135 and is discharged to the upper rear side of the driving seat 128.

The diesel engine 1, the radiator 121, and the exhaust gas purification case 38 are arranged linearly in a front and back direction inside an engine room 147 defined by the bonnet 139 and the like. In the structure in which the cooling air is discharged from the cooling fan 9 on the rear part of the diesel engine 1 to the rear side of the machine body via the radiator 121 so as to cool the diesel engine 1, there is disposed a wind shield guide plate 148 surrounding the front side and the upper and lower sides of the exhaust gas purification case 38 disposed behind the radiator 121, and the wind shield guide plate 148 is fixed to the traveling machine body 124 via a support frame 149 in an attachable and detachable manner. Thus, temperature drop of the exhaust gas purification case 33 due to the wind from the cooling fan 9 after passing through the radiator 121 is prevented.

The diesel engine 1 is arranged so that the flywheel housing 10 is positioned on the front side of the traveling machine body 124. In other words, the diesel engine 1 is disposed in such a manner that the direction of the engine output shaft 74 is the front and back direction of the traveling machine body 124. A front side of the flywheel housing 10 is connected to a mission case 132. The power output from the diesel engine 1 via the flywheel 10 is appropriately speed-changed by the mission case 132 and is transmitted to a hydraulic drive source 133 for the front wheels 122 and the fork 126. The output of the diesel engine 1 is transmitted from a travel drive shaft 134 to the front wheels 122 so as to move forward or backward.

Figure 11:
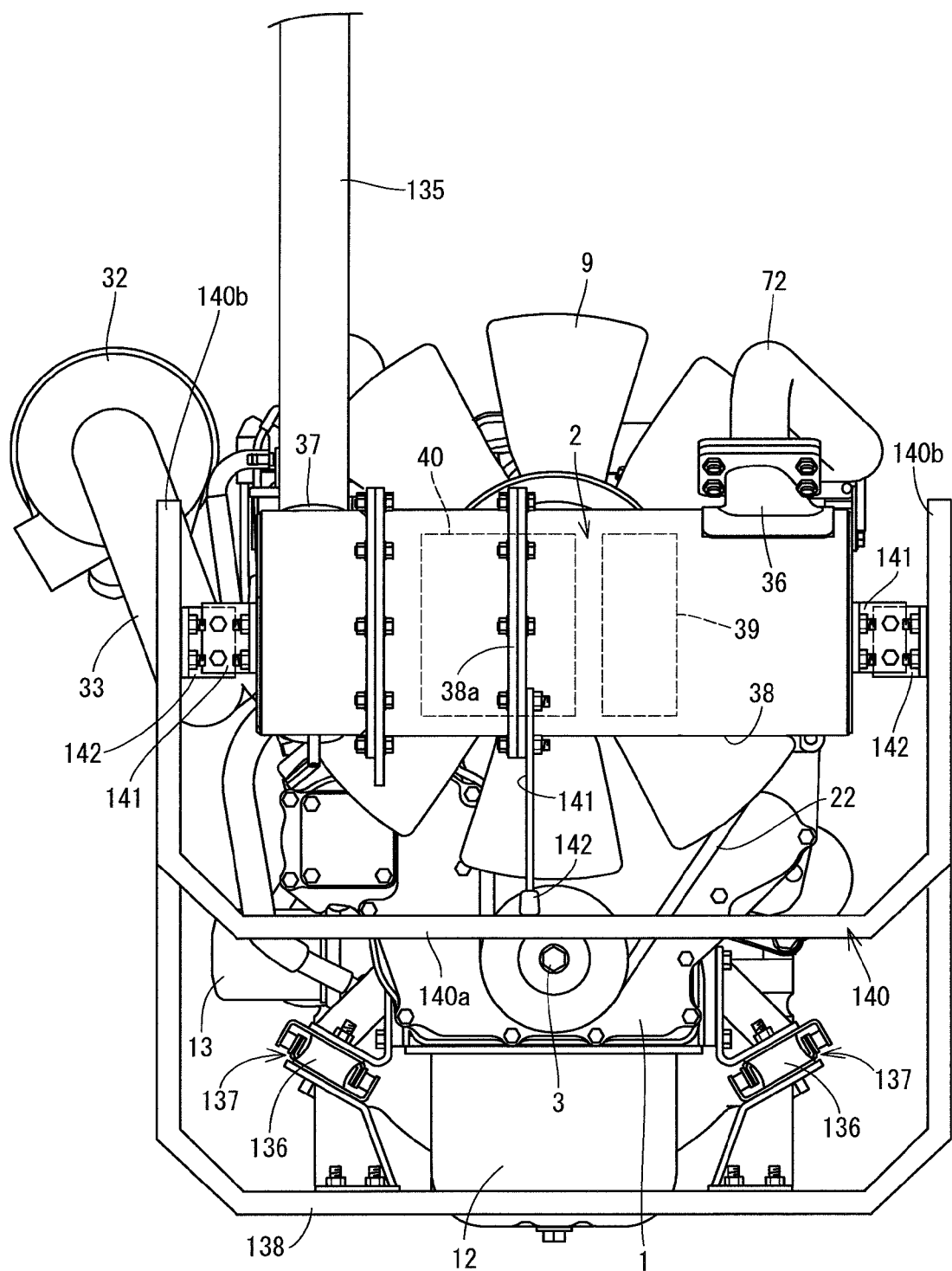
FIG. 11 is an explanatory view of attachment between the diesel engine and an exhaust gas purification case.

As shown in FIG. 11, a machine body rear chassis 140 having a U shape viewed from the rear is formed integrally to an engine attachment chassis 138 constituting a part of the traveling machine body 124. The machine body rear chassis 140 includes a horizontal bottom plate part 140a and vertical right and left side plate parts 140b. An upper end side of the center leg 141 is fastened with bolts to a flange body 38a of the exhaust gas purification case 38, and a rubber cushion body 142 is engaged with a lower end side of the center leg 141, so that the lower end side of the center leg 141 abuts the upper surface of the bottom plate part 140a via the rubber cushion body 142.

The inlet pipe 36 and the outlet pipe 37 are disposed on the cylindrical outer peripheral surface of the exhaust gas purification case 38, right and left case side support bodies 143 are fastened with bolts to right and left end surfaces of the cylindrical exhaust gas purification case 38 elongated in a right and left direction, right and left case receiving bracket bodies 144 are fastened with bolts to inner surface sides of the right and left side plate parts 140b, and the right and left case side support bodies 143 are fastened with bolts to the right and left case receiving bracket bodies 144 so that the attachment position can be adjusted. In other words, the right and left center of the cylindrical exhaust gas purification case 38 is supported by the upper surface of the bottom plate part 140a via the center leg 141, while the right and left end parts of the cylindrical exhaust gas purification case 38 are connected to the right and left side plate parts 140b via the case side support body 143 and the case receiving bracket body 144, so that the machine body rear chassis 140 supports the exhaust gas purification case 38 in an attachable and detachable manner.

In the state where the bottom plate part 140a supports the exhaust gas purification case 38 via the center leg 141, the case side support body 143 and the case receiving bracket body 144 can be fastened with bolts, and the exhaust gas purification case 38 can be easily assembled to the machine body rear chassis 140.

Figure 9:
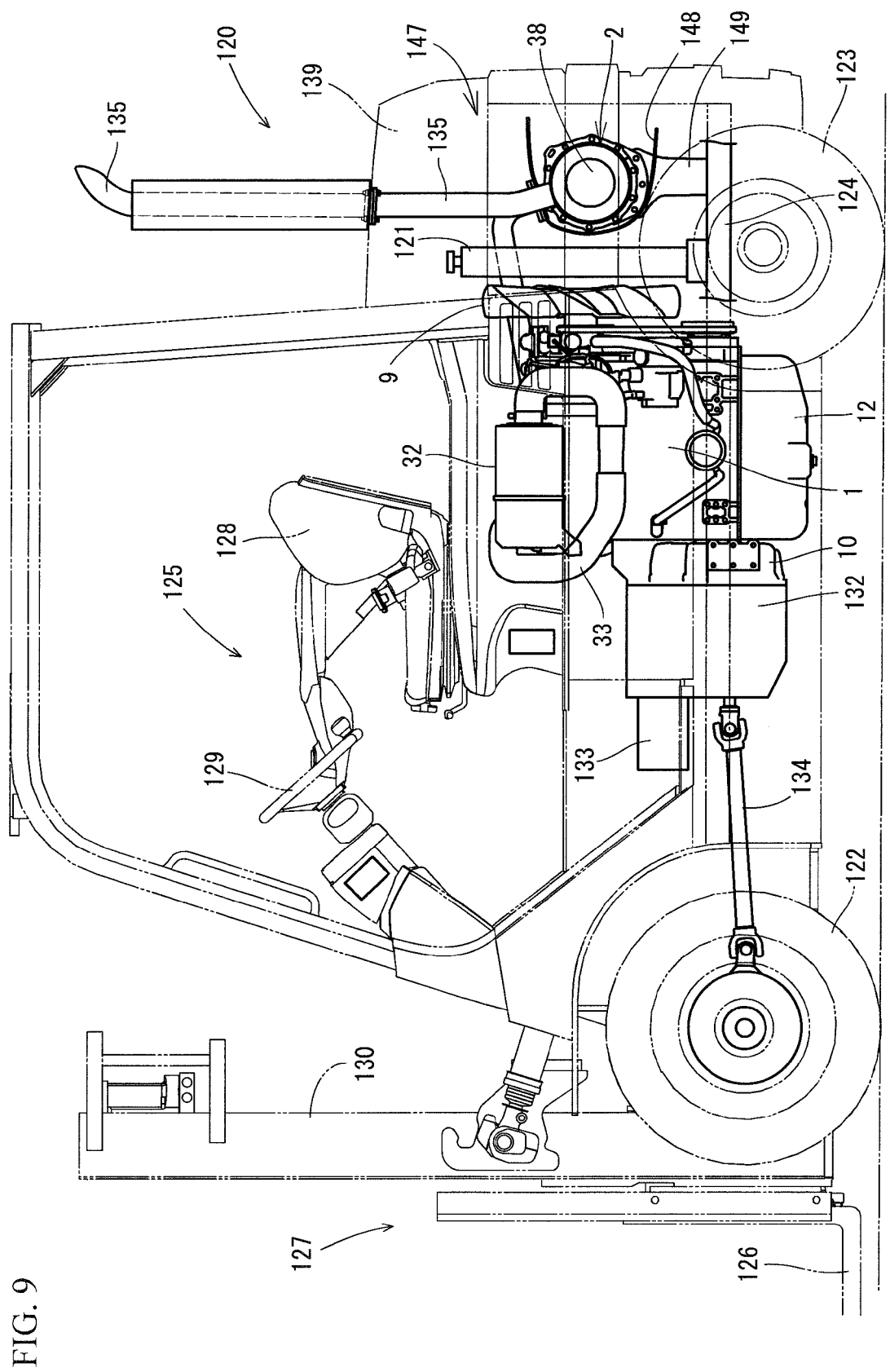
FIG. 9 is an enlarged explanatory view of FIG. 7.
Figure 10:
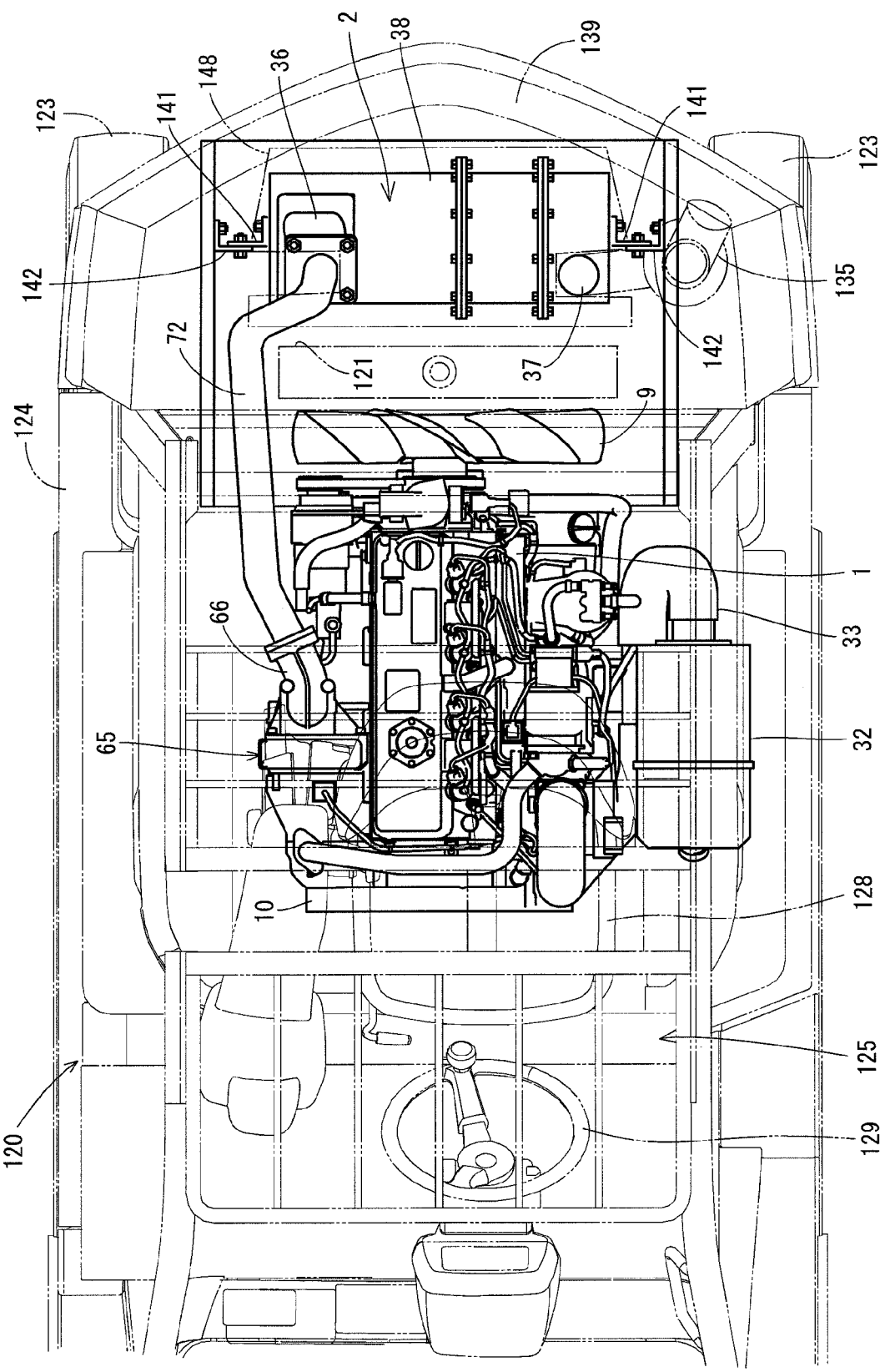
FIG. 10 is an enlarged explanatory view of FIG. 8.

As shown in FIGS. 9 to 11, in the engine device including the exhaust gas purification case 38 for processing the exhaust gas from the diesel engine 1, in which the exhaust gas purification case 38 is disposed on the main machine 120 side on which the diesel engine 1 is mounted, the machine body rear chassis 140 is provided as a main machine frame on which the diesel engine 1 and the like are mounted. The machine body rear chassis 140 is provided with the center leg 141 as a bottom support member for supporting the exhaust gas purification case 38, and the case side support body 143 and the case receiving bracket body 114 as the side support member for fastening and fixing the exhaust gas purification case 38 to the machine body rear chassis 140 in an attachable and detachable manner. Accordingly, the machine body rear chassis 140 temporarily supports the exhaust gas purification case 38 with the center lea 141, and the machine body rear chassis 140 and the side surfaces of the exhaust gas purification case 38 can be fastened easily via the case side support body 143 and the case receiving bracket body 144. Thus, assembling workability of the exhaust gas purification case 38 can be easily improved.

As shown in FIGS. 9 to 11, the both sides and the lower surface side of the exhaust gas purification case 38 are surrounded by the machine body rear chassis 140, the exhaust gas purification case 38 is assembled to the machine body rear chassis 140 from above, and the right and left center of the exhaust gas purification case 38 is supported by the center leg 141. On the other hand, the right and left sides of the exhaust gas purification case is supported by the case side support body 143 and the case receiving bracket body 144. Accordingly, three sides of the exhaust gas purification case 38 can be connected to the machine body rear chassis 140, and hence the support structure of the exhaust gas purification case 38 can be easily configured.

As shown in FIGS. 9 to 11, the center leg 141 is disposed on at least one of the lower surface side of the exhaust gas purification case 38 and the upper surface of the machine body rear chassis 140 opposed to the lower surface side of the exhaust gas purification case 38, while the case side support body 143 and the case receiving bracket body 144 are disposed on at least one set of the right and left sides of the exhaust gas purification case 38 and the inside surfaces of the machine body rear chassis 140 opposed to the right and left sides of the exhaust gas purification case 38. Accordingly, the exhaust gas purification case 38 having a large weight can be easily supported by the center leg 141. For instance, when the exhaust gas purification case 38 is attached or detached, it is possible to easily prevent the exhaust gas purification case 38 from dropping off from the support position. In addition, because the both sides of the exhaust gas purification case 38 are fixed to the machine body rear chassis 140 via the case side support body 143 and the case receiving bracket body 144, it is possible to easily prevent the exhaust gas purification case 38 from being deformed or damaged due to mechanical vibration or the like.

As shown in FIGS. 1 to 11, the tail pipe 135 is disposed and biased to the side portion opposite to the exhaust manifold 7 disposing side of the diesel engine 1 among the side portions of the main machine (fork lift truck 120) provided with the work portion 127 (fork 126), the exhaust gas purification case 38 is disposed to face the cooling fan 9 of the diesel engine 1, and the inlet pipe 36 side of the exhaust gas purification case 38 is disposed on the same side portion as the exhaust manifold 7 disposing side of the diesel engine 1. Accordingly, the exhaust gas purification case 38 can be easily assembled utilizing an excess space of the cooling fan 9 disposing portion, and the tail pipe 135 or the exhaust manifold 7 can be easily connected to the exhaust gas inlet or outlet side of the exhaust gas purification case 38.

Figure 7:
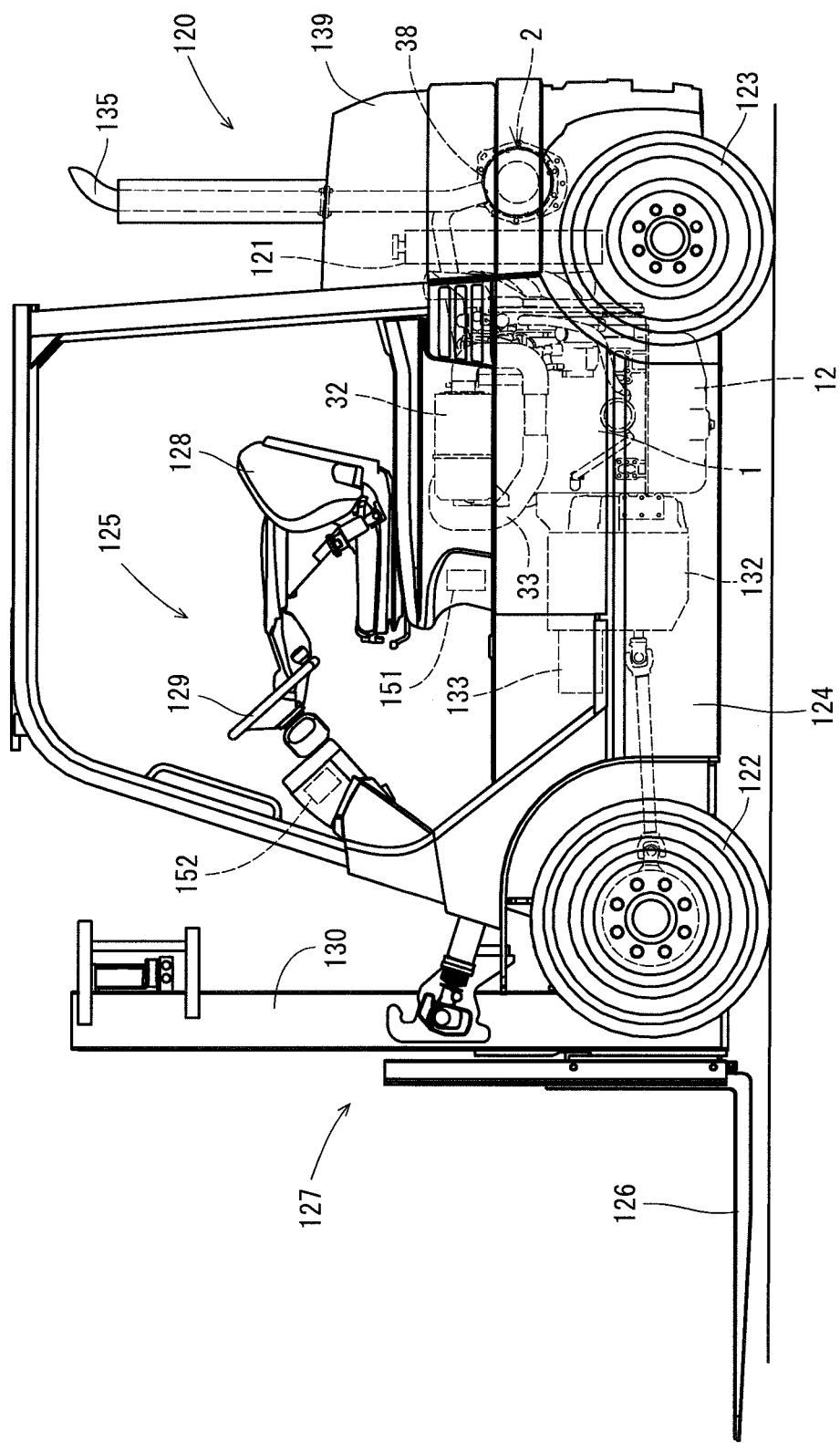
FIG. 7 is a side view of a fork lift truck.
Figure 8:
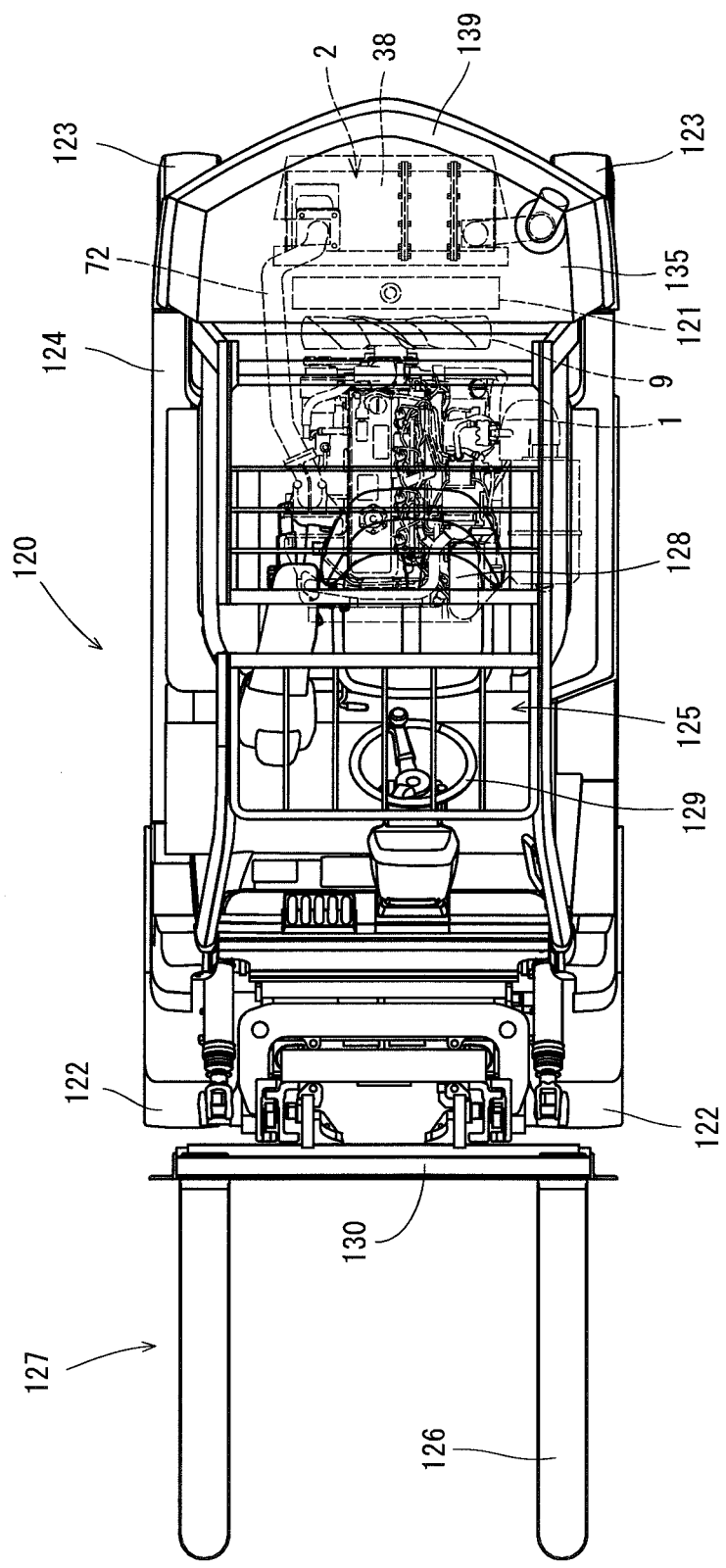
FIG. 8 is a plan view of the fork lift truck.
Figure 12:
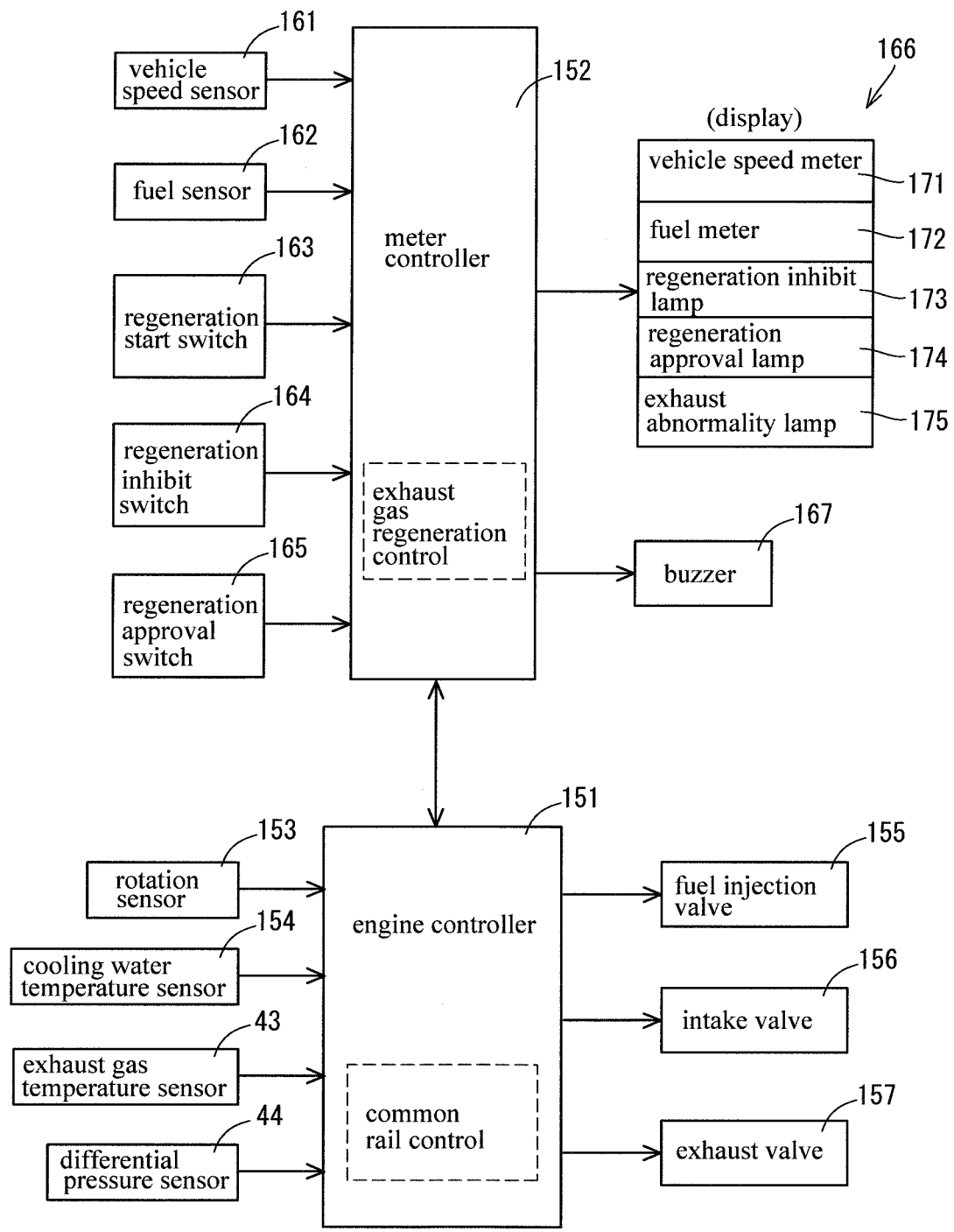
FIG. 12 is a control circuit diagram of the diesel engine.
Figure 13:
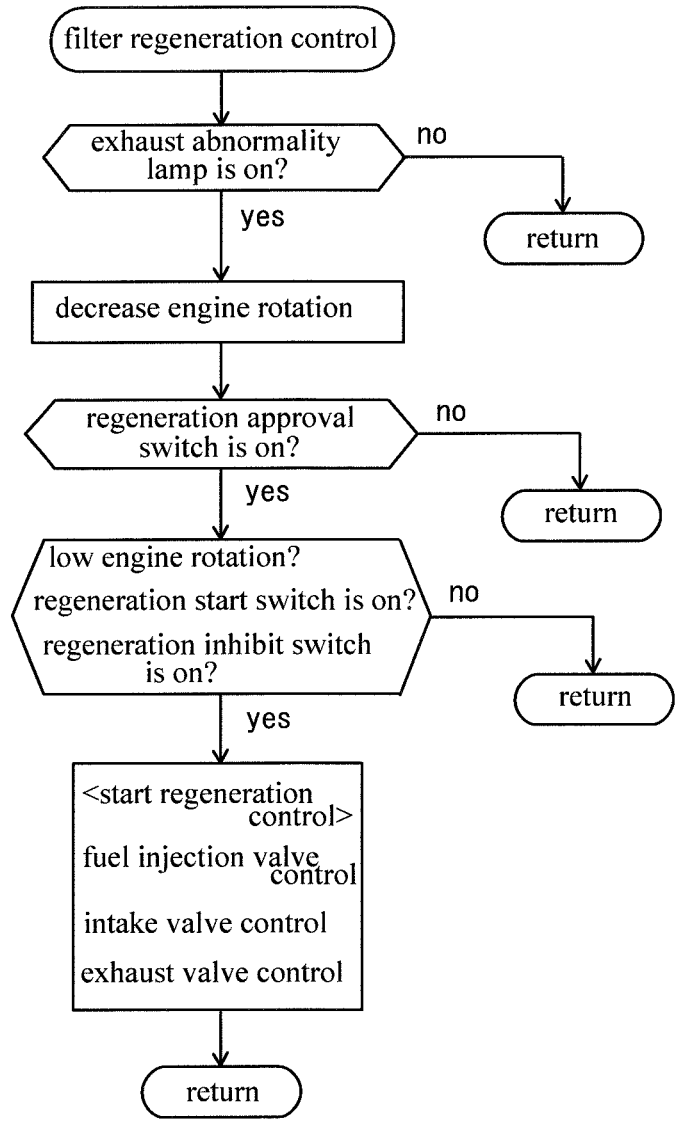
FIG. 13 is an exhaust gas purification flowchart.
Figure 14:
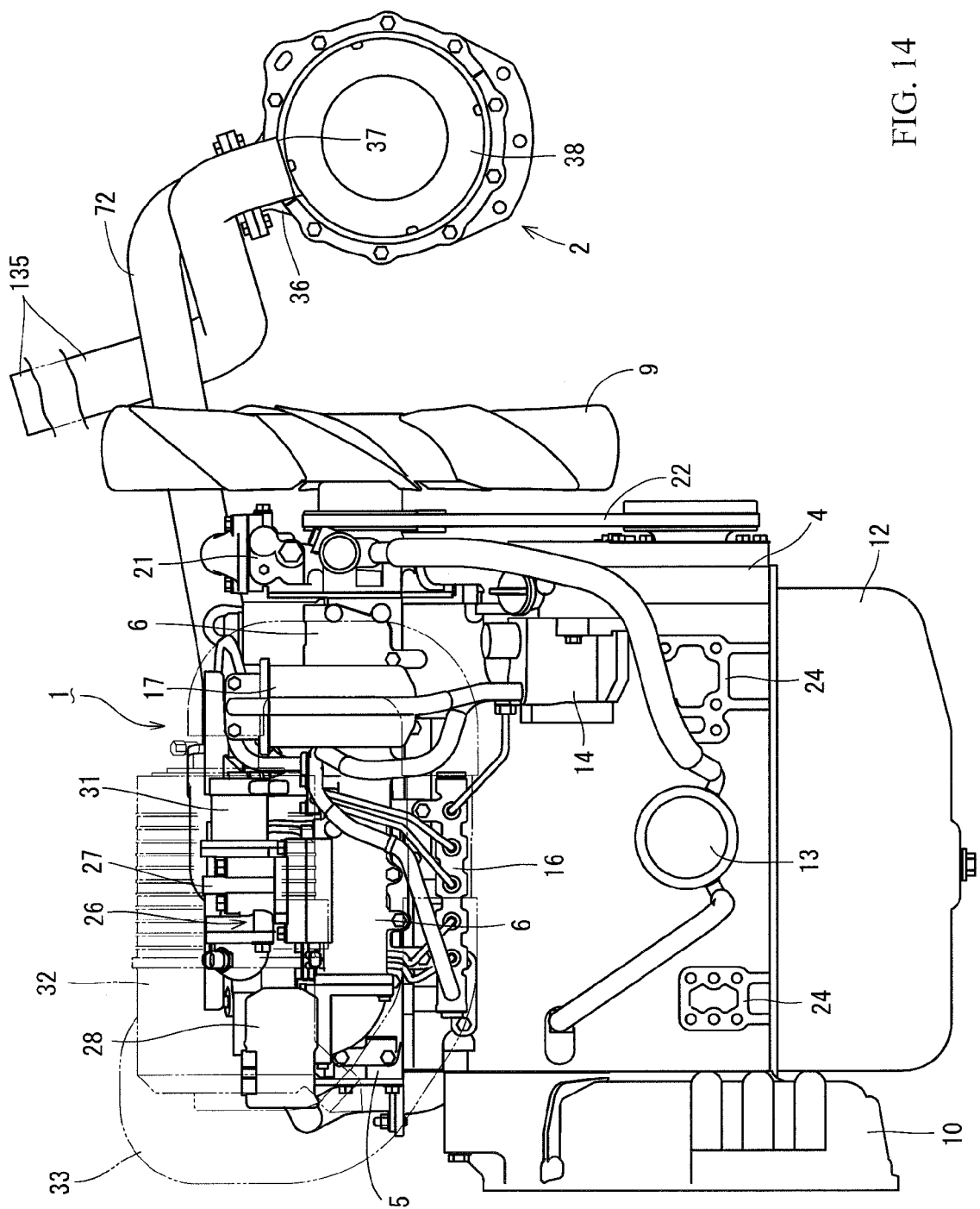
FIG. 14 is a right side view of a diesel engine showing a second embodiment.
Figure 15:
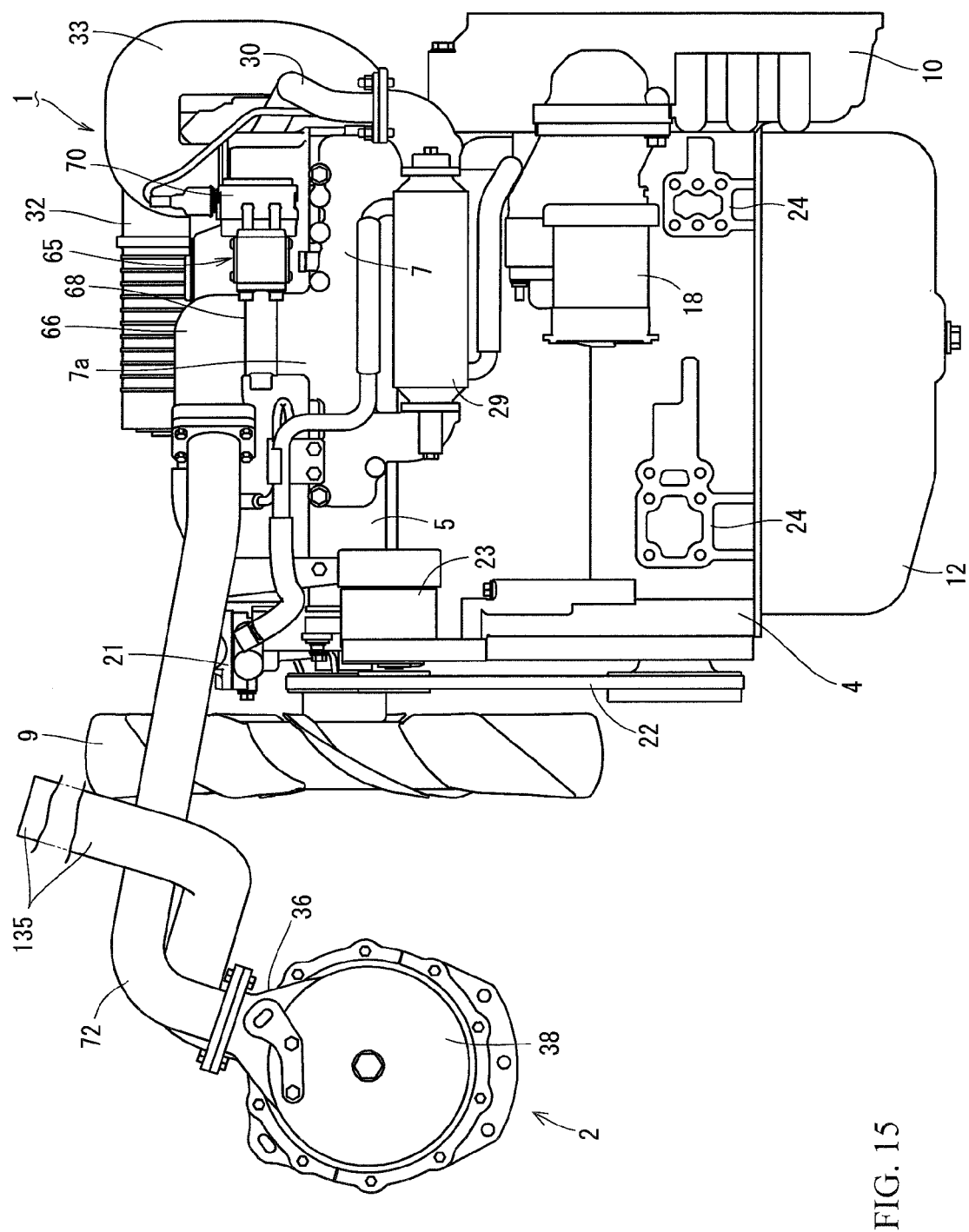
FIG. 15 is a left side view of the same.
Figure 16:
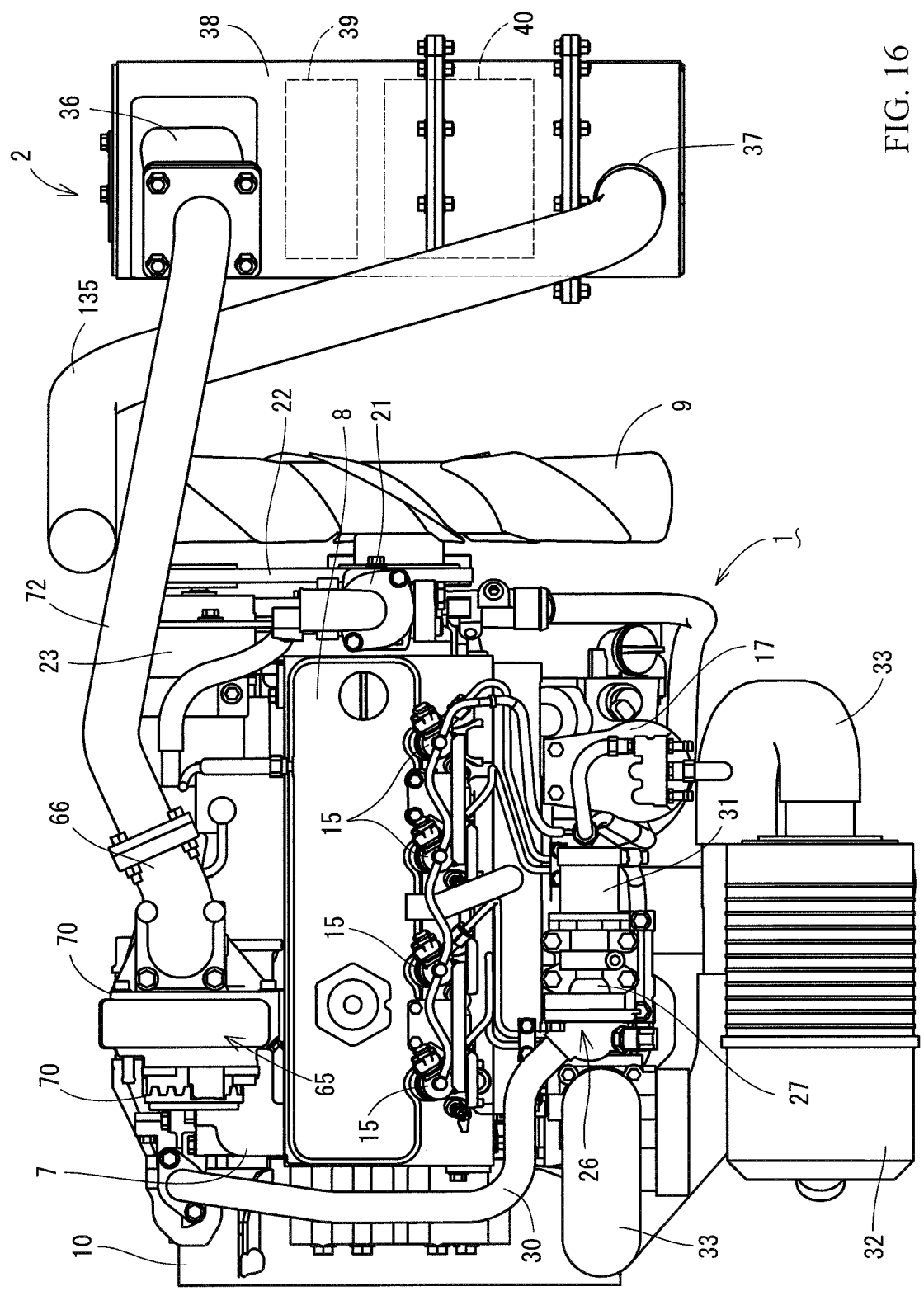
FIG. 16 is a plan view of the same.
Figure 17:
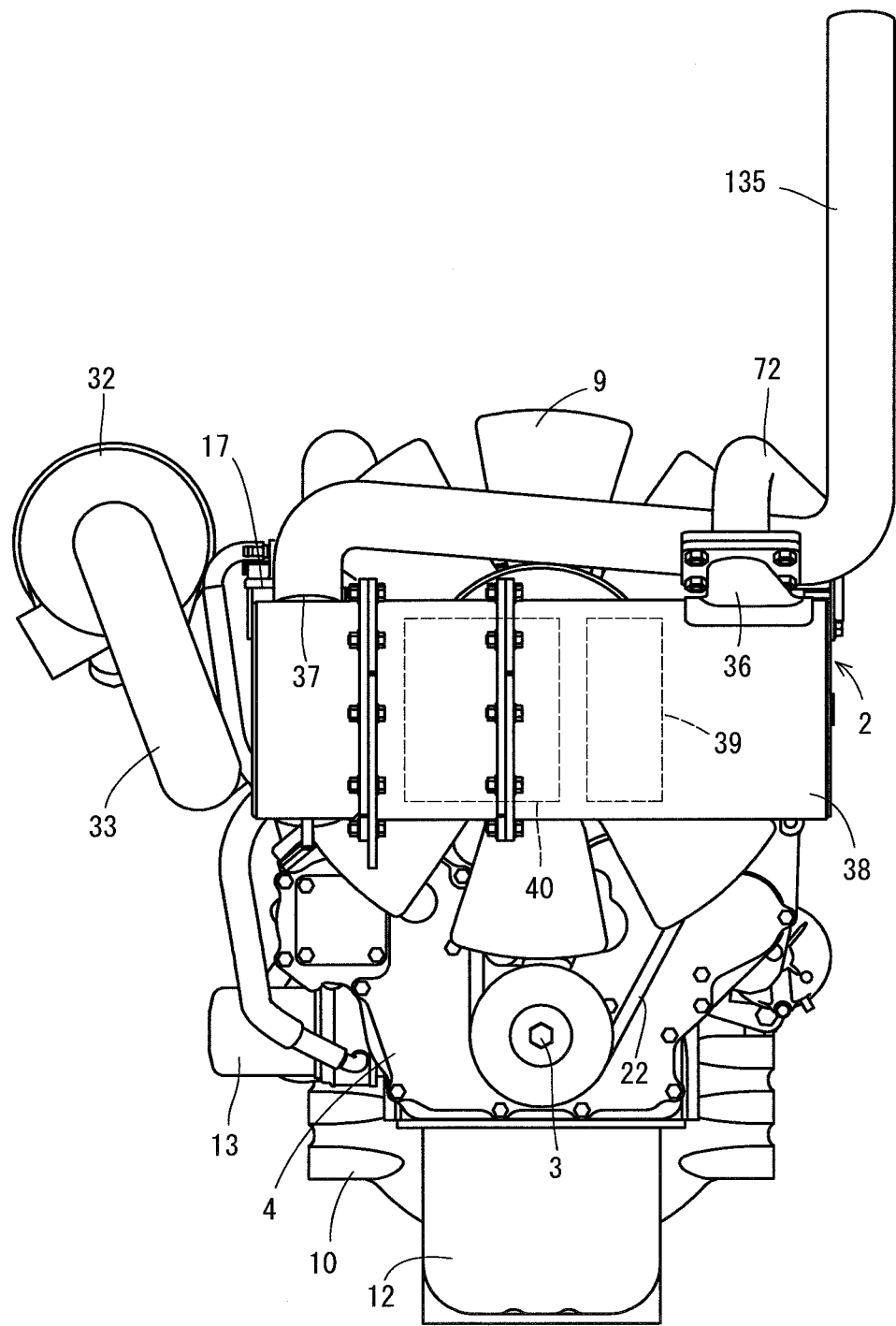
FIG. 17 is a front view of the same.
Figure 18:
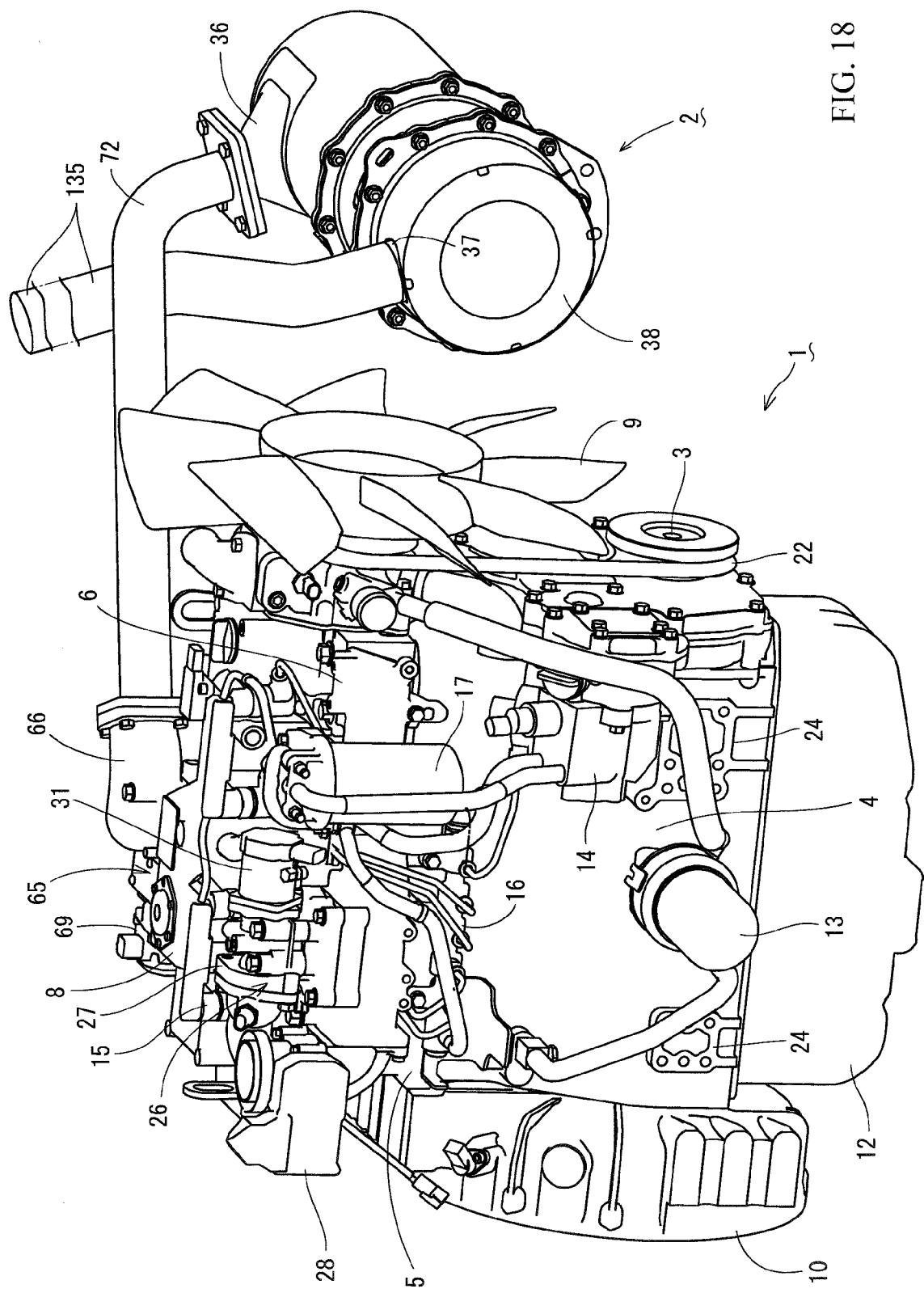
FIG. 18 is a right perspective view of the same.
Figure 19:
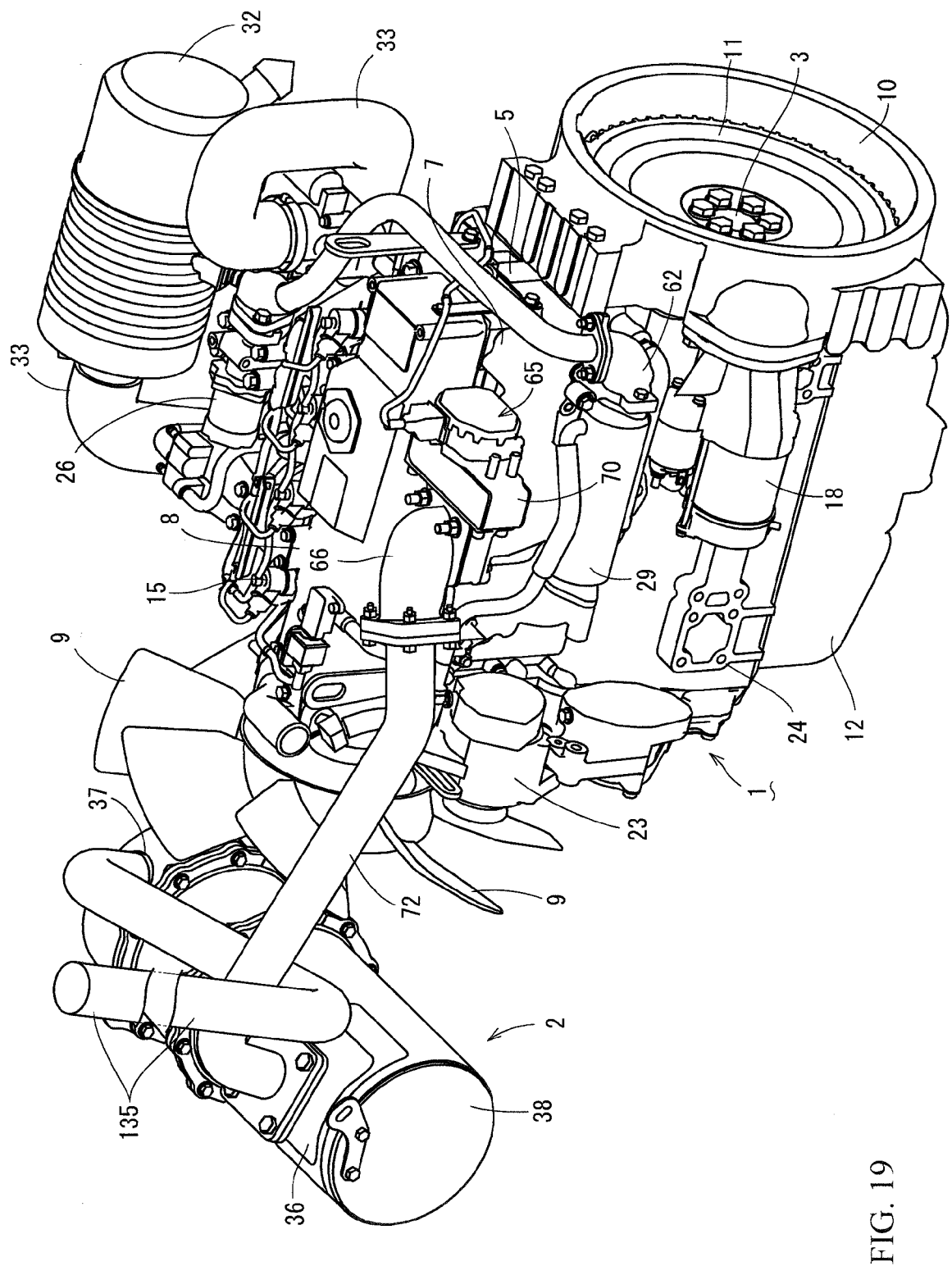
FIG. 19 is a left perspective view of the same.
Figure 20:
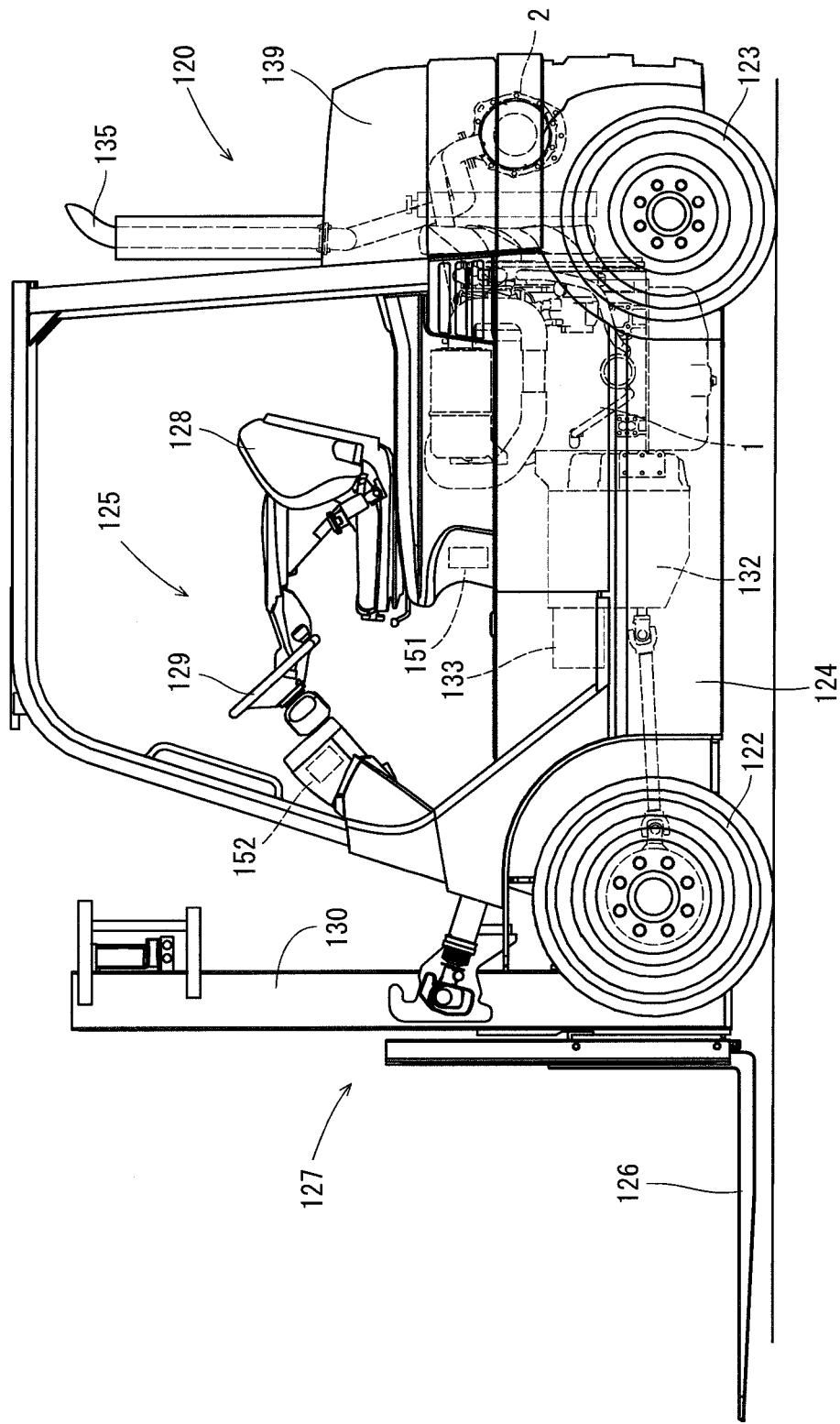
FIG. 20 is a side view of a fork lift truck.
Figure 21:
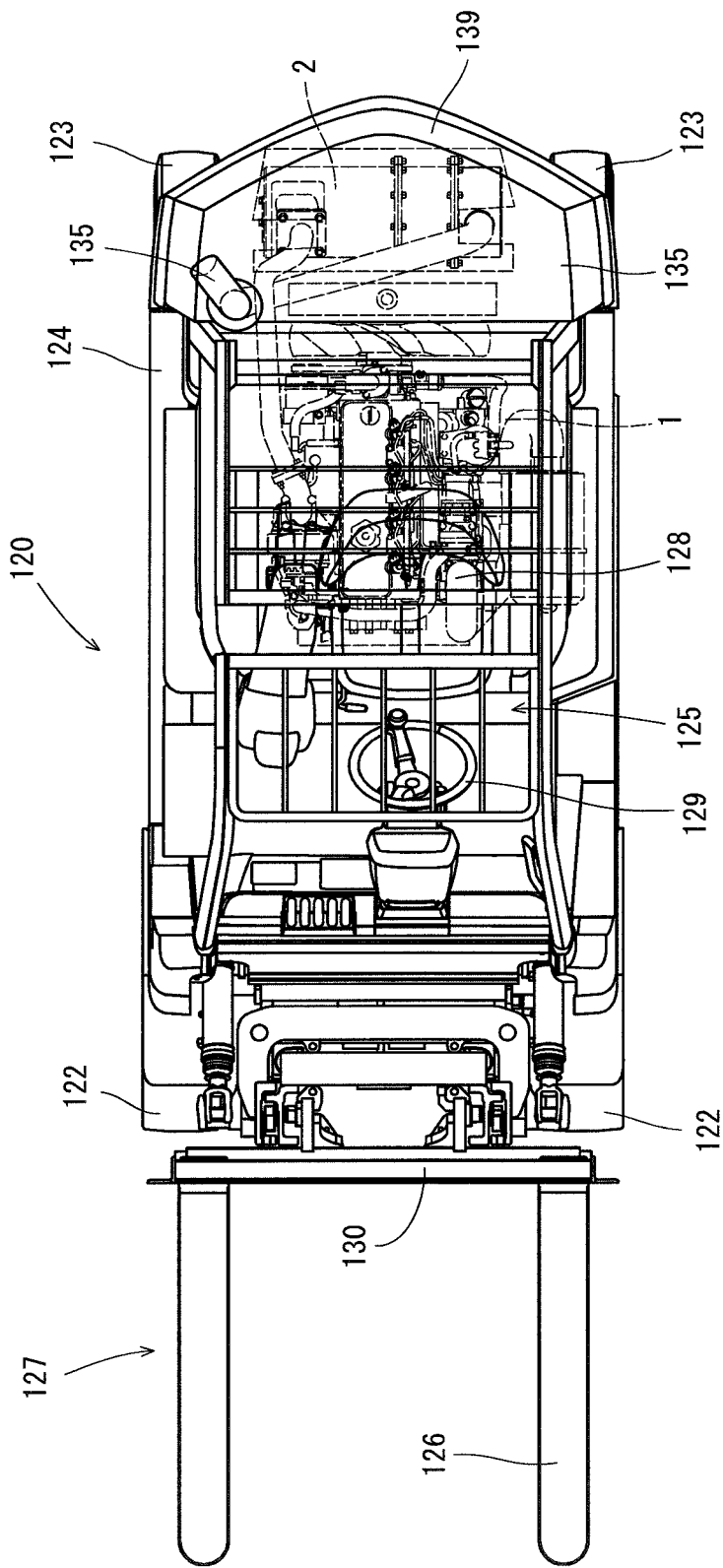
FIG. 21 is a plan view of the fork lift truck.
Figure 22:
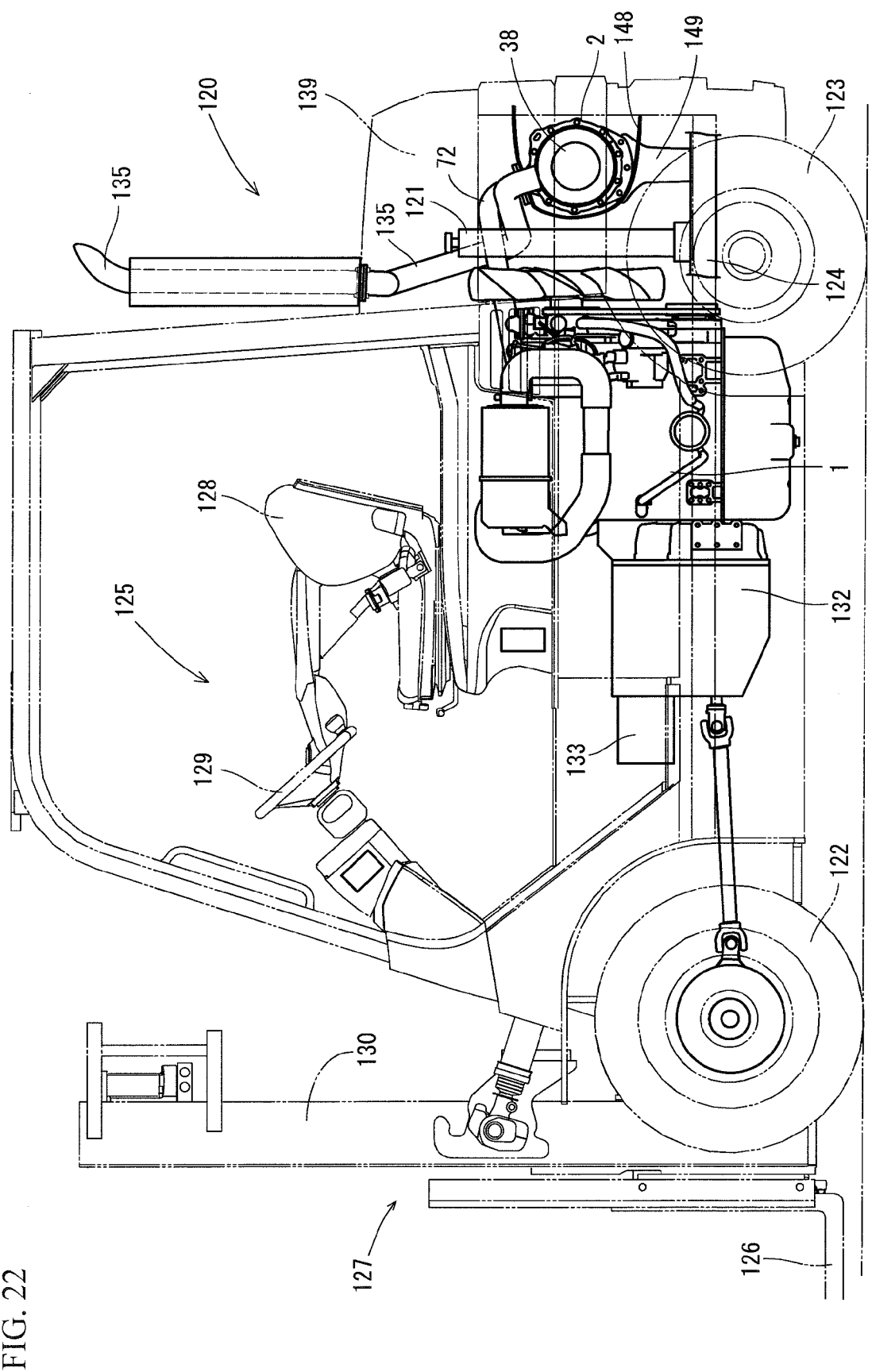
FIG. 22 is an enlarged explanatory view of FIG. 20.
Figure 23:
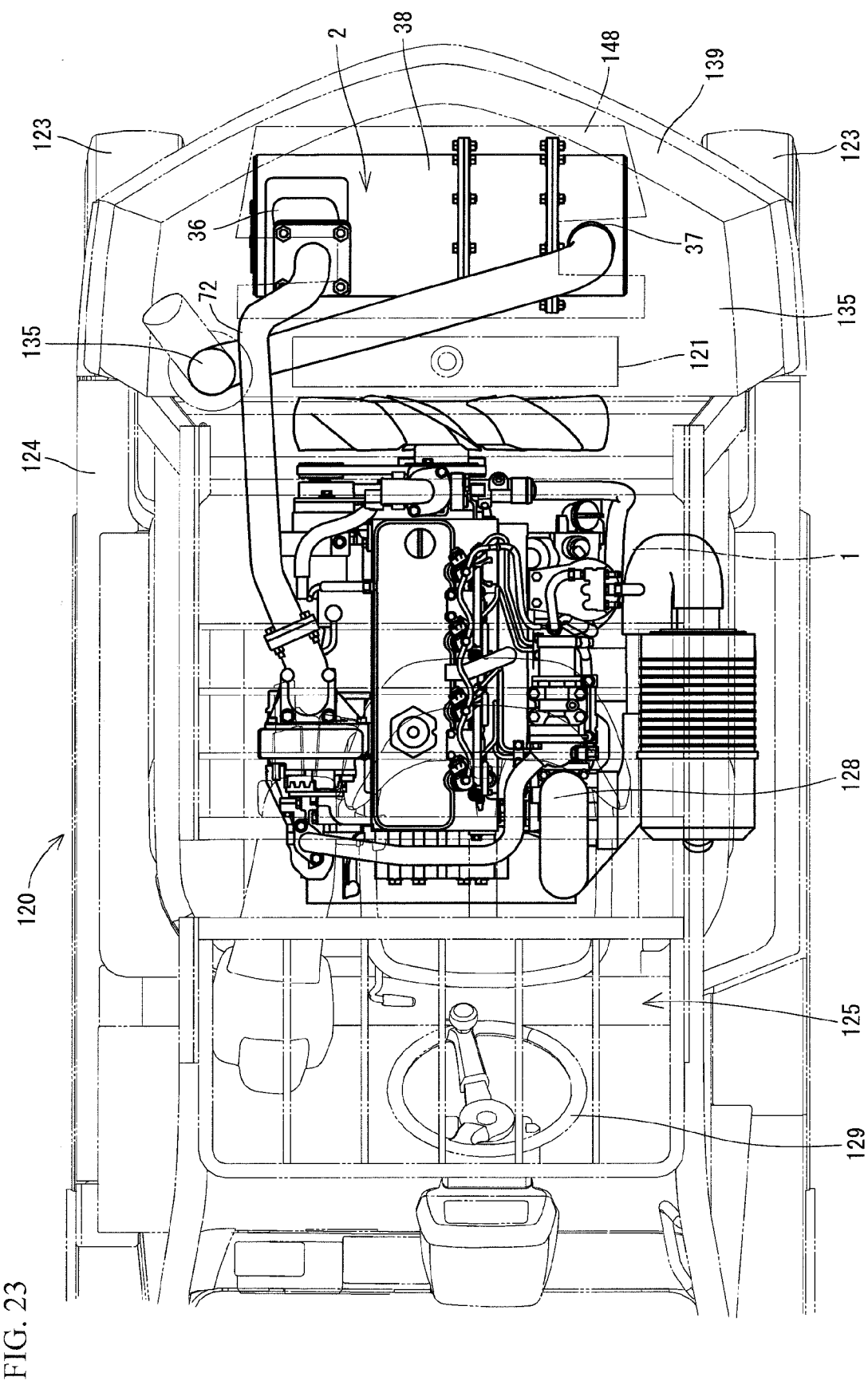
FIG. 23 is an enlarged explanatory view of FIG. 21.

Next, with reference to FIGS. 7, 12, and 13, regeneration control of the soot filter 40 disposed in the exhaust gas purification device 2 is described. As shown in FIGS. 7, 12, and 13, an engine controller 151 is disposed in the vehicle body in which the driving seat 128 is disposed, and a meter controller 152 is disposed in a handle column with the steering wheel 129. The engine controller 151 and the meter controller 152 are connected and communicated via a LAN cable enabling mutual communication.

A rotation sensor 153 for detecting rotational frequency of the diesel engine 1, a cooling water temperature sensor 154 for detecting cooling water temperature of the diesel engine 1, the exhaust gas temperature sensors 43 for detecting exhaust gas temperatures (on the exhaust gas inlet and outlet sides of the soot filter 40) of the diesel engine 1, and the differential pressure sensor 44 for detecting an exhaust gas pressure difference between the exhaust gas inlet side and the exhaust gas outlet side of the soot filter 40 are connected to inputs of the engine controller 151 having a function of controlling the common rail 16. A fuel injection valve 155 of the common rail 16, an intake valve 156 of the intake throttle member 28, and an exhaust valve 157 of the throttle valve case 68 are connected to outputs of the engine controller 151.

A vehicle speed sensor 161 for detecting traveling speed of the fork lift truck 120, a fuel sensor 162 for detecting remaining fuel to be supplied to the diesel engine 1, an interlocking regeneration start switch 163 for detecting that a parking brake is on or a traveling clutch is off, a manual regeneration inhibit switch 164 for inhibiting regeneration control of the soot filter 40, and a manual regeneration approval switch 165 for approving regeneration control of the soot filter 40 are connected to inputs of the meter controller 152 having a function of regeneration control of the soot filter 40. A display 166 as a liquid crystal display and a buzzer 167 are connected to outputs of the meter controller 152. The display 166 includes a vehicle speed meter 171 for displaying traveling speed of the fork lift truck 120, a fuel meter 172 for displaying remaining fuel to be supplied to the diesel engine 1, a regeneration inhibit lamp 173 for displaying the on state of the regeneration inhibit switch 164, a regeneration approval lamp 174 for displaying the on state of the regeneration approval switch 165, and an exhaust abnormality lamp 175 for displaying an exhaust gas state of the diesel engine 1 (abnormality of exhaust gas temperature or exhaust gas pressure). Note that it is possible to dispose a plurality of exhaust abnormality lamps 175 for displaying abnormalities of a low level, a medium level, and a high level, respectively.

As shown in the flowchart of FIG. 13, when soot is deposited on the soot filter 40 or when accumulated operation time of the diesel engine 1 has passed, the exhaust abnormality lamp 175 is turned on so as to notify an abnormality to the operator, the rotational frequency of the diesel engine 1 is automatically decreased by control of the fuel injection valve 155 of the common rail 16, and the abnormality is notified to the operator. When the operator turns on the regeneration approval switch 165, the diesel engine 1 is operated at a low rotational frequency, and by the work stop operation by the operator, the regeneration start switch 163 is turned on, and the regeneration control of the soot filter 40 is started in the state where the regeneration inhibit switch 164 is maintained to be off. The regeneration control of the soot filter 40 is performed by automatic control of the fuel injection valve 155, automatic control of the intake valve 156, and automatic control of the exhaust valve 157.

As shown in FIGS. 7, 9, 12, and 13, in the engine device provided with the exhaust gas purification case 38 for processing exhaust gas from the diesel engine 1, in which the exhaust gas purification case 38 is disposed on the fork lift truck 120 as a main machine with the diesel engine 1, there are disposed the display 166 as the operation display portion for displaying an operation state of the diesel engine 1 and the like, the engine controller 151 for controlling the diesel engine 1 and the like, and the regeneration approval switch 165 as the regeneration operation tool of the exhaust gas purification case 38. The display 166 (meter controller 152) is electrically connected to the regeneration approval switch 165. Accordingly, the regeneration approval switch 165 suitable for an operation condition of the regeneration control or the like of the diesel engine 1 or the exhaust gas purification case 38 can be easily disposed at a position for the operator to easily operate, without substantially changing the display 166 (meter controller 152), the engine controller 151, or the like.

As shown in FIGS. 7, 9, 12, and 13, the engine controller 151 is disposed on the intake upstream side of the cooling air in the engine room 147 in which the diesel engine 1 and the like are disposed. Accordingly, it is possible to prevent temperature of the engine controller 151 from being abnormally raised due to heating of the diesel engine 1, the exhaust gas purification case 38, or the like. Thus, a malfunction or the like of the engine controller 151 can be easily prevented, while durability of the engine controller 151 and the like can be improved.

As shown in FIGS. 7, 9, 12, and 13, when proceeding to the operation state requiring regeneration of the exhaust gas purification case 38, a rotational frequency of the diesel engine 1 is automatically decreased, and an abnormal operation state is notified to the operator. Further, the meter controller 152 of the display 166 and the engine controller 151 are connected with the communication line enabling mutual communication. Accordingly, when the operator operates the throttle to increase the rotation, the rotation of the diesel engine 1 is maintained at a low rotation, and hence the operator can smoothly check the abnormal operation state of the diesel engine 1. In addition, the meter controller 152 can easily hold the regeneration control function of the exhaust gas purification case 38, and a specification of the display 166 or a specification of the engine controller 151 can be easily set with little restriction. For instance, without substantially restricted by a specification of the diesel engine 1, it is possible to set a regeneration control specification of the exhaust gas purification case 38 suitable for the operating condition. The regeneration control function of the exhaust gas purification case 38 can be improved.

Next, with reference to FIGS. 14 to 23, there is described a structure of the fork lift truck 120 in which the diesel engine is mounted as a second embodiment. The tail pipe 135 is disposed to stand at the left side rear part of the fork lift truck 120 (side portion opposite to the side portion on which the exhaust manifold 7 of the diesel engine 1 is disposed) in the first embodiment. In contrast, as shown in FIGS. 7, 12, and 13, in the second embodiment, the tail pipe 135 is disposed to stand at the right side rear part of the fork lift truck 120 (side portion on which the exhaust manifold 7 of the diesel engine 1 is disposed). The exhaust pipe 72, through which the exhaust manifold 7 communicates to the exhaust gas purification case 38, is disposed to extend in the front and back direction of the machine body so as to go around the right side portion of the radiator 121. In this structure, the proximal end of the tail pipe 135 extends in the right and left direction in the bonnet 139. The exhaust pipe 72 extending in the front and back direction of the machine body and the tail pipe 135 in the bonnet 139 cross each other. The tail pipe 135 extends below the exhaust pipe 72, and the exhaust pipe 72 is supported at a position away from the air flow path of the cooling fan 9. Thus, a temperature drop of the exhaust gas in the exhaust pipe 72 is prevented, and the tail pipe 135 is cooled by the air from the cooling fan 9, so that temperature of the exhaust gas discharged from the tail pipe 135 is decreased.

As shown in FIGS. 1 to 11, and 14 to 23, in the engine device provided with the exhaust gas purification case 38 for processing exhaust gas from the diesel engine 1, in which the exhaust gas purification case 38 is disposed in the fork lift truck 120 as a main machine with the diesel engine 1, the exhaust gas outlet of the diesel engine 1 and the exhaust gas inlet of the exhaust gas purification case 38 are disposed on a straight line parallel to the output shaft axis of the diesel engine 1. Accordingly, the diesel engine 1 or the exhaust gas purification case 38 can be disposed in accordance with the structure or the like of the engine room 147, while a temperature of the exhaust gas supplied to the exhaust gas purification case 38 can be easily maintained. Thus, the exhaust gas purification function of the exhaust gas purification case 38 can be appropriately maintained.

As shown in FIGS. 14 to 23, in the structure in which the tail pipe 135 is disposed and biased to the side portion of the exhaust manifold 7 disposing side of the diesel engine 1 among side portions of the fork lift truck 120 (main machine) in which the work portion 127 (fork 126) is disposed, the exhaust gas purification case 38 is disposed to face the cooling fan 9 of the diesel engine 1, and the inlet pipe 36 side of the exhaust gas purification case 38 is disposed on the same side portion as the exhaust manifold 7 disposing side of the diesel engine 1, while the purification outlet pipe 37 (tail pipe 135) of the exhaust gas purification case 38 extends below the exhaust pipe 72 between the exhaust manifold 7 and the purification inlet pipe 36. Accordingly, the exhaust pipe 72 between the exhaust manifold 7 and the purification inlet pipe 36 can be disposed away from the air flow path of the cooling fan 9 of the diesel engine 1. Thus, a temperature of the exhaust gas moving to the exhaust gas purification case 38 via the exhaust pipe 72 can be easily maintained, the purification outlet pipe 37 of the exhaust gas purification case 38 can be easily disposed in accordance with a position of the tail pipe 135. In addition, the purification outlet pipe 37 of the exhaust gas purification case 38 is disposed to extend to the air flow path of the cooling fan 9 of the diesel engine 1, so that the exhaust gas temperature is decreased while the exhaust gas can be discharged from the purification outlet pipe 37 to the outside of the machine. Thus, it is possible to prevent the tail pipe 135 or the like from being heated by the exhaust gas.

Figure 24:
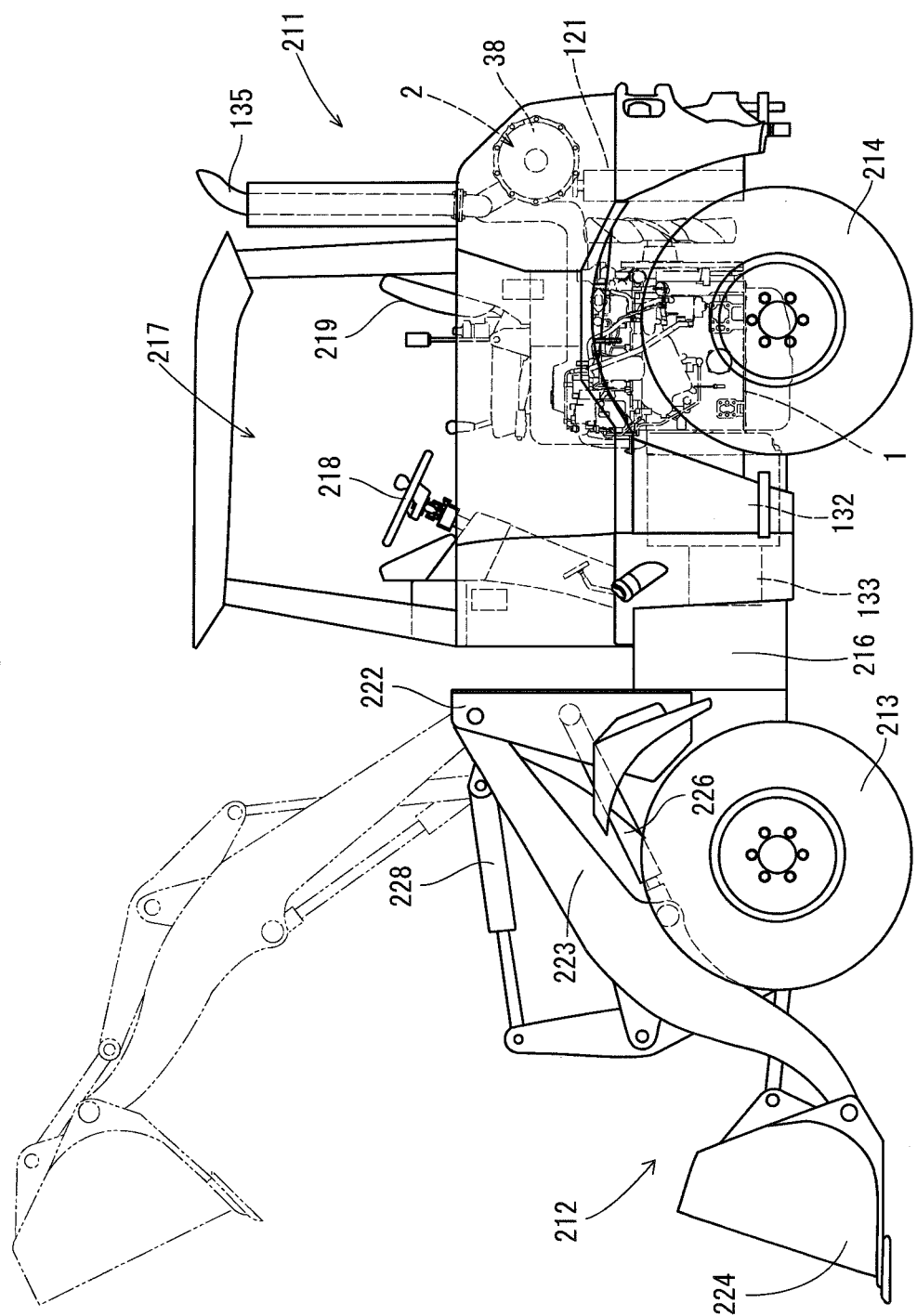
FIG. 24 is a side view of a skid steering loader.
Figure 25:
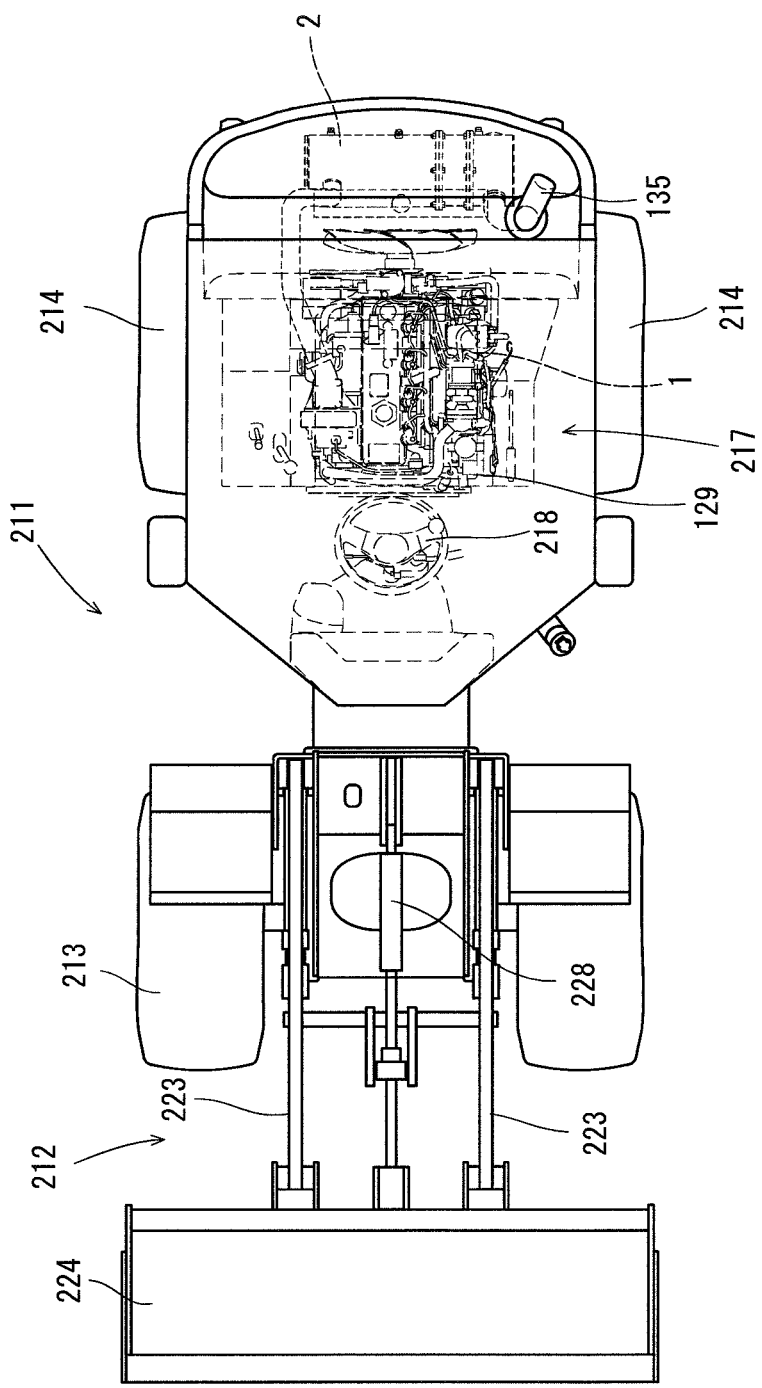
FIG. 25 is a plan view of the skid steering loader.

Next, with reference to FIGS. 24 and 25, a structure in which the diesel engine 1 is mounted in a skid steering loader 211 is described. The skid steering loader 211 shown in FIGS. 24 and 25 is provided with a traveling machine body 216 having a pair of right and left front wheels 213 and rear wheels 214 similarly to the fork lift truck 120. A driving part 217 and the diesel engine 1 are mounted in the traveling machine body 216. A loader device 212 as a work portion is attached to the front side portion of the traveling machine body 216, so that a loading work can be performed. A driving seat 219 for an operator to sit, a steering wheel 218, operation means for operating outputs of the diesel engine 1 and the like, a lever, a switch, or the like as operation means of the loader device 212, and the like are disposed in the driving part 125.

The loader device 212 as a work portion is disposed above the front wheels 213 on the front part of the skid steering loader 211 as described above. The loader device 212 includes loader posts 222 disposed on the right and left sides of the traveling machine body 216, a pair of right and left lift arms 223 connected to the upper end of the loader posts 222 in a vertically swingable manner, and a bucket 224 connected to distal ends of the right and left lift arms 223 in a vertically swingable manner.

A lift cylinder 226 for vertically swinging the lift arm 223 is disposed between each of the loader posts 222 and the corresponding lift arm 223. A bucket cylinder 228 for vertically swinging the bucket 224 is disposed between each of the right and left lift arms 223 and the bucket 224. In this case, the operator on the driving seat 219 operates a loader lever (not shown) so that the lift cylinders 226 and the bucket cylinders 228 are expanded or contracted, and hence the lift arms 223 and the bucket 224 are moved to vertically swing for performing the loading work.

Also in this skid steering loader 211, similarly to the fork lift truck 120, the diesel engine 1 is disposed below the driving seat 219, and the exhaust gas purification device 2 (exhaust gas purification case 38) is disposed behind the diesel engine 1 (radiator 121). Accordingly, the exhaust pipe 72 connecting the diesel engine 1 and the exhaust gas purification device 2 extends backward from the right side of the diesel engine 1 (radiator 121), and the exhaust gas purification device 2 is disposed away from the diesel engine 1. In addition, the tail pipe 135 connecting to the exhaust gas purification device 2 extends upward from the exhaust as purification device 2 behind the left side of the driving seat 219. In this way, the exhaust gas discharged from the exhaust gas purification device 2 passes through the tail pipe 135 and is discharged upward behind the driving seat 219.

EXPLANATION OF NUMERALS 1 diesel engine
7 exhaust manifold
9 cooling fan
36 purification inlet pipe
37 purification outlet pipe
38 exhaust gas purification case
72 exhaust pipe
120 fork lift truck (main machine)
127 work portion
135 tail pipe
140 machine body rear chassis (main machine frame)
141 center leg (bottom support member)
143 case side support body (side support member)
144 case receiving bracket body (side support member)
147 engine room
151 engine controller
152 meter controller
165 regeneration approval switch (regeneration operation tool)
166 display (operation display portion)

The invention claimed is:

1. An engine device comprising
   an exhaust gas purification case for processing exhaust gas from an engine, the exhaust gas purification case being disposed on a main machine side on which the engine is mounted; and
   a main machine frame in which the engine is disposed, wherein
   the main machine frame is provided with a bottom support member for supporting the exhaust gas purification case, and a side support member for connecting and fixing the exhaust gas purification case to the main machine frame in an attachable and detachable manner, and
   both sides and a bottom side of the exhaust gas purification case are surrounded by the main machine frame, the exhaust gas purification case is assembled to the main machine frame from above, right and left center portions of the exhaust gas purification ease are supported by the bottom support member, and right and left sides of the exhaust gas purification case are supported by the side support member.

2. The engine device according to claim 1, wherein the bottom support member is disposed on at least one of an exhaust gas purification case lower surface and a main machine frame upper surface opposed to the exhaust gas purification case lower surface, and the side support member is disposed on at least one set of right and left side surfaces of the exhaust gas purification case and main machine frame inside surfaces opposed to the right and left side surfaces of the exhaust gas purification case.

3. The engine device according to claim 1, wherein an exhaust gas outlet of the engine and an exhaust gas inlet of the exhaust gas purification case are disposed on a straight line parallel to an output shaft axis of the engine.

4. The engine device according to claim 1, comprising an operation display portion for displaying an operation state of the engine, an engine controller for controlling the engine, and a regeneration operation tool of the exhaust gas purification case, wherein the operation display portion is electrically connected to the regeneration operation tool.

5. An engine device comprising
   an exhaust gas purification case for processing exhaust gas from an engine, the exhaust gas purification case being disposed on a main machine side on which the engine is mounted; and
   a main machine frame in which the engine is disposed, wherein
   the main machine frame is provided with a bottom support member for supporting the exhaust gas purification case, and a side support member for connecting and fixing the exhaust gas purification case to the main machine frame in an attachable and detachable manner, and
   an exhaust gas outlet of the engine and an exhaust gas inlet of the exhaust gas purification case are disposed on a straight line parallel to an output shall axis of the engine, and
   a tail pipe is disposed and biased to a side portion opposite to an exhaust manifold disposing side of the engine among side portions of the main machine provided with a work portion, the exhaust gas purification case is disposed to be opposed to a cooling fan of the engine, and an inlet pipe side of the exhaust gas purification case is disposed on the same side portion as the exhaust manifold disposing side of the engine.

6. An engine device comprising
an exhaust gas purification case for processing exhaust gas from an engine, the exhaust gas purification case being disposed on a main machine side on which the engine is mounted; and
a main machine frame in which the engine is disposed, wherein
the main machine frame is provided with a bottom support member for supporting the exhaust gas purification case, and a side support member rot connecting and fixing the exhaust gas purification case to the main machine frame in an attachable and detachable manner, and
wherein a tail pipe is disposed and biased to a side portion on an exhaust manifold disposing side of the engine among side portions of the main machine provided with a work portion, the exhaust gas purification case is disposed to be opposed to a cooling fan of the engine, an inlet pipe side of the exhaust gas purification case is disposed on the same side portion as the exhaust manifold disposing side of the engine, and an outlet pipe of the exhaust gas purification case is disposed to extend below an exhaust pipe between the exhaust manifold and the inlet pipe.

7. An engine device comprising
an exhaust gas purification case for processing exhaust gas from an engine, the exhaust gas purification case being disposed on a main machine side on which the engine is mounted; and
a main machine frame in which the engine is disposed, wherein
the main machine frame is provided with a bottom support member for supporting the exhaust gas purification case, and a side support member for connecting and fixing the exhaust gas purification case to the main machine frame in an attachable and detachable manner, and
the engine controller is disposed on an intake upstream side of cooling air in an engine room in which the engine is disposed.

8. An engine device comprising
an exhaust gas purification case for processing exhaust gas from an engine, the exhaust gas purification case being disposed on a main machine side on which the engine is mounted; and
a main machine frame in which the engine is disposed, wherein
an operation display portion for displaying an operation state of the engine, an engine controller for controlling the engine, and a regeneration operation tool of the exhaust gas purification case, wherein the operation display portion is electrically connected to the regeneration operation tool, wherein
the main machine frame is provided with a bottom support member for supporting the exhaust gas purification case, and a side support member for connecting and fixing the exhaust gas purification case to the main machine frame in an attachable and detachable manner, and
when proceeding to an operation state requiring regeneration of the exhaust gas purification case, a rotational frequency of the engine is automatically decreased, an abnormal operation state is notified to an operator, and a meter controller of the operation display portion and the engine controller are connected with a communication line enabling mutual communication.

* * * * *